(12) United States Patent
Kim et al.

(10) Patent No.: US 12,220,966 B2
(45) Date of Patent: Feb. 11, 2025

(54) HEAT PUMP SYSTEM FOR VEHICLE

(71) Applicants: Hyundai Motor Company, Seoul (KR); Kia Corporation, Seoul (KR)

(72) Inventors: Jeawan Kim, Hwaseong-si (KR); Hochan An, Hwaseong-si (KR); Yeonho Kim, Seoul (KR); Man Hee Park, Suwon-si (KR); Yeong Jun Kim, Incheon (KR); Jae Yeon Kim, Hwaseong-si (KR); Hoyoung Jeong, Daegu (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 213 days.

(21) Appl. No.: 17/983,983

(22) Filed: Nov. 9, 2022

(65) Prior Publication Data
US 2023/0415539 A1 Dec. 28, 2023

(30) Foreign Application Priority Data
Jun. 24, 2022 (KR) .......................... 1020220077818

(51) Int. Cl.
*B60H 1/00* (2006.01)
*B60H 1/14* (2006.01)

(52) U.S. Cl.
CPC ..... *B60H 1/00278* (2013.01); *B60H 1/00328* (2013.01); *B60H 1/00885* (2013.01); *B60H 1/143* (2013.01); *B60H 2001/00307* (2013.01)

(58) Field of Classification Search
CPC ............ B60H 1/00278; B60H 1/00328; B60H 1/00885; B60H 1/143; B60H 1/32284; B60H 1/00392; B60H 1/004; B60H 2001/00307; B60H 2001/00949
See application file for complete search history.

(56) References Cited

U.S. PATENT DOCUMENTS

| | | | |
|---|---|---|---|
| 9,441,865 B2 | 9/2016 | Inaba et al. | |
| 10,661,631 B2 | 5/2020 | Kawano | |
| 12,030,367 B2* | 7/2024 | Kim | B60H 1/3205 |
| 2020/0180391 A1* | 6/2020 | Kim | B60H 1/3223 |
| 2020/0369108 A1* | 11/2020 | Kim | B60H 1/00921 |
| 2022/0324286 A1* | 10/2022 | Kim | B60H 1/143 |
| 2024/0010046 A1* | 1/2024 | Kim | B60H 1/00921 |

FOREIGN PATENT DOCUMENTS

| | | |
|---|---|---|
| KR | 101558314 B1 | 10/2015 |
| KR | 20200040432 A | 4/2020 |

* cited by examiner

*Primary Examiner* — Marc E Norman
(74) *Attorney, Agent, or Firm* — Slater Matsil, LLP

(57) ABSTRACT

An embodiment is a heat pump system for a vehicle, including a first cooling device including a first radiator, a first water pump, and a first valve connected by a first coolant line, a second cooling device including a second radiator and a second water pump connected by a second coolant line, a third cooling device including a third coolant line connected to the second cooling device through a first valve, a third water pump provided on the third coolant line, and a battery module and, a chiller provided on the third coolant line, and a gas injection device configured to selectively expand a refrigerant supplied from an internal condenser included in an air conditioner and supply the expanded refrigerant to a heat exchanger of the air conditioner, and selectively supply a portion of the refrigerant to a compressor.

20 Claims, 6 Drawing Sheets

HEAT PUMP SYSTEM FOR VEHICLE

CROSS-REFERENCE TO RELATED APPLICATIONS

This application claims priority to and the benefit of Korean Patent Application No. 10-2022-0077818 filed in the Korean Intellectual Property Office on Jun. 24, 2022, which application is incorporated herein by reference.

TECHNICAL FIELD

The present invention relates to a heat pump system for a vehicle.

BACKGROUND

Generally, an air conditioning system for a vehicle includes an air conditioner unit circulating a refrigerant in order to heat or cool an interior of the vehicle.

The air conditioner unit, which is to maintain the interior of the vehicle at an appropriate temperature regardless of a change in an external temperature to maintain a comfortable interior environment, is configured to heat or cool the interior of the vehicle by heat-exchange by a condenser and an evaporator in a process in which a refrigerant discharged by driving of a compressor is circulated back to the compressor through the condenser, a receiver drier, an expansion valve, and the evaporator.

That is, the air conditioner unit lowers a temperature and a humidity of the interior by condensing a high-temperature high-pressure gas-phase refrigerant compressed from the compressor by the condenser, passing the refrigerant through the receiver drier and the expansion valve, and then evaporating the refrigerant in the evaporator in a cooling mode in summer.

Meanwhile, recently, in accordance with a continuous increase in an interest in energy efficiency and an environmental pollution problem, the development of an environmentally-friendly vehicle capable of substantially substituting for an internal combustion engine vehicle has been demanded, in which the environmentally-friendly vehicle is classified into an electric vehicle driven using a fuel cell or electricity as a power source and a hybrid vehicle driven using an engine and a battery.

In the electric vehicle or the hybrid vehicle among these environmentally-friendly vehicles, a separate heater is not used unlike an air conditioner of a general vehicle, and an air conditioner used in the environmentally-friendly vehicle is generally called a heat pump system.

Meanwhile, the electric vehicle generates driving force by converting chemical reaction energy between oxygen and hydrogen into electric energy. In this process, heat energy is generated by a chemical reaction in a fuel cell. Therefore, it is necessary in securing performance of the fuel cell to effectively remove generated heat.

In addition, the hybrid vehicle generates driving force by driving a motor using electricity supplied from the fuel cell described above or an electrical battery, together with an engine operated by a general fuel. Therefore, heat generated from the fuel cell or the battery and the motor should be effectively removed in order to secure performance of the motor.

Therefore, in the hybrid vehicle or the electric vehicle according to the related art, cooling means, a heat pump system, and a battery cooling system, respectively, should be configured as separate closed circuits so as to prevent heat generation of the motor, an electrical component, and the battery including a fuel cell.

Therefore, a size and a weight of a cooling module disposed at the front of the vehicle are increased, and a layout of connection pipes supplying a refrigerant and a coolant to each of the heat pump system, the cooling means, and the battery cooling system in an engine compartment becomes complicated.

In addition, since the battery cooling system warming up or cooling the battery according to a state of the vehicle is separately provided so that the battery exhibits optimal performance, a plurality of valves for connecting the respective connection pipes to each other are used, and noise and vibrations due to frequency opening/closing operations of these valves are transferred to the interior of the vehicle, such that a ride comfort is deteriorated.

In addition, when heating the interior of the vehicle, there are disadvantages of decreasing heating performance due to a lack of a heat source, increasing electricity consumption due to the use of an electric heater, increasing power consumption of the compressor, and the like.

The above information disclosed in this background section is only for enhancement of understanding of the background of the invention, and therefore it may contain information that does not form the prior art that is already known to a person of ordinary skill in the art.

SUMMARY

The present invention relates to a heat pump system for a vehicle, and more particularly, to a heat pump system for a vehicle capable of controlling a temperature of a battery module by using a single chiller in which a refrigerant and a coolant exchange heat with each other, and improving heating performance and efficiency by using an external heat source and waste heat generated from an electrical component.

The present invention has been made in an effort to provide a heat pump system for a vehicle having advantages of improving heating performance and efficiency by using one chiller in which a refrigerant and a coolant exchange heat with each other to control a temperature of a battery module, and by selectively recovering an external heat source and waste heat generated from an electrical component and using the recovered waste heat for indoor heating.

In addition, the present invention has been made in an effort to provide a heat pump system for a vehicle having advantages of maximizing heating performance by increasing a flow rate of a refrigerant by applying a gas injection device selectively operating in a heating mode of the vehicle.

An exemplary embodiment of the present invention provides a heat pump system for a vehicle, including: a first cooling device including a first radiator, a first water pump, and a first valve connected by a first coolant line and circulating a first coolant on the first coolant line to cool at least one electrical device provided on the first coolant line; a second cooling device including a second radiator and a second water pump connected by a second coolant line, and circulating a second coolant on the second coolant line; a third cooling device including a third coolant line connected to the second cooling device through a first valve, a third water pump provided on the third coolant line, and a battery module and selectively circulating the second coolant on the third coolant line; a chiller provided on the third coolant line, connected to a refrigerant line of an air conditioner through a refrigerant connection line, and exchanging heat between the second coolant selectively introduced through the third coolant line and a coolant selectively supplied from the air conditioner to control a temperature of the second coolant circulated on the third coolant line; and a gas injection device selectively expanding a refrigerant supplied from an internal condenser included in the air conditioner and supplying the expanded refrigerant to a heat exchanger of the air conditioner, and selectively supplying a portion of the refrigerant to a compressor in the refrigerant supplied from the internal condenser to the compressor to increase a flow rate of the refrigerant circulated on the refrigerant line, in which the heat exchanger may be connected to the first coolant line and the second coolant line, respectively, so that the first coolant and the second coolant pass through, and the gas injection device may include: a gas-liquid separator separating a gas refrigerant and a liquid refrigerant among the refrigerants introduced thereinto and selectively discharging the gas refrigerant and the liquid refrigerant; a supply unit connected to the internal condenser through the refrigerant line so that the refrigerant supplied from the internal condenser is introduced; a first expansion valve provided between the gas-liquid separator and the supply unit to selectively expand the refrigerant supplied to the supply unit and supply the expanded refrigerant to the gas-liquid separator; a second expansion valve provided between the gas-liquid separator and the supply unit to selectively expand the refrigerant supplied to the supply unit and supply the expanded refrigerant to the heat exchanger or supply the refrigerant supplied from the gas-liquid separator to the heat exchanger; and a supply line connecting the gas-liquid separator and the compressor, and selectively supplying a gaseous refrigerant from the gas-liquid separator to the compressor.

The air conditioner may include: a HVAC module including an evaporator connected through the refrigerant line and including an opening/closing door provided therein to control external air passing through the evaporator to be selectively introduced into the internal condenser according to cooling, heating, and dehumidifying modes of the vehicle; a compressor connected between the evaporator and the internal condenser through the refrigerant line; a sub-condenser provided on the refrigerant line between the heat exchanger and the evaporator; a third expansion valve provided on the refrigerant line connecting the sub condenser and the evaporator; a fourth expansion valve provided on the refrigerant connection line; an accumulator provided on the refrigerant line between the evaporator and the compressor and connected to the refrigerant connection line; and a dehumidifying line having one end connected to the refrigerant line between the internal condenser and the heat exchanger and the other end connected to the refrigerant line between the evaporator and the third expansion valve, and including a check valve.

The heat exchanger may additionally condense or evaporate a refrigerant condensed in the internal condenser by heat-exchanging the refrigerant with a first coolant and a second coolant or any one of the first and second coolants according to a selective operation of the gas injection device.

The fourth expansion valve may expand the coolant introduced through the coolant connection line and introduce the expanded coolant into the chiller when the battery module is cooled using the coolant that is heat-exchanged heat with the refrigerant.

When the gas injection device operates in a heating mode of the vehicle, the first expansion valve may expand the refrigerant supplied from the internal condenser through the supply unit and supply the expanded refrigerant to the gas-liquid separator, the second expansion valve may expand the refrigerant supplied from the gas-liquid separator and make the expanded refrigerant flow into the refrigerant line, the supply line may be opened, and the gas-liquid separator may supply the gaseous refrigerant among the refrigerants introduced thereinto to the compressor through the opened supply line.

When the gas injection device does not operate in a heating mode of the vehicle, an operation of the first expansion valve may stop; the introduction of the refrigerant into the gas-liquid separator may be blocked, and the second expansion valve may expand the refrigerant supplied from the internal condenser through the supply unit and supply the expanded refrigerant to the heat exchanger.

When a cooling mode or dehumidifying mode of the vehicle, an operation of the first expansion valve may stop in the gas injection device, the second expansion valve may make the refrigerant flow through the refrigerant line without expanding the refrigerant supplied from the internal condenser through the supply unit, and the introduction of the refrigerant into the gas-liquid separator may be blocked.

The air conditioner may further include a refrigerant branch line selectively introducing the refrigerant discharged from the heat exchanger directly into the accumulator between the heat exchanger and the sub-condenser through an operation of a refrigerant valve provided on the refrigerant line.

The refrigerant valve may open the refrigerant branch line in a heating mode of the vehicle.

The first cooling device may be provided with a first branch line connected to the first coolant line between a first radiator and a first water pump through the first valve provided on the first coolant line between the first radiator and the first water pump, the second cooling device may be provided with a second branch line separating the second coolant line and the third coolant line, and the third cooling device may be provided with a third branch line connected to the third coolant line through a second valve to form a closed circuit independent of the second cooling device.

When the battery module is cooled in a cooling mode of the vehicle, in the first cooling device, the first branch line may be closed through an operation of the first valve, and the first coolant cooled by the first radiator may be circulated to an electrical component through an operation of the first water pump, the second branch line may be closed, and the third branch line may be closed through an operation of the second valve, the second coolant line and the third coolant line may be connected by the closed second and third branch lines, in the second cooling device and the third cooling device, the second coolant may be circulated on the second coolant line and the third coolant line through an operation of the second water pump and an operation of the third water pump, in the third cooling device, the second coolant passing through the chiller may be supplied to the battery module, in the air conditioner, the refrigerant may be circulated along the refrigerant line and the refrigerant connection line while the refrigerant connection line is opened through an operation of the fourth expansion valve, the third and fourth expansion valves may expand the refrigerant so that the expanded refrigerant is supplied to the evaporator and the chiller, respectively, the refrigerant branch line may be closed through the operation of the refrigerant valve, and in the gas injection device, the second expansion valve may supply the refrigerant supplied from the internal condenser to the heat exchanger without expanding the refrigerant.

In the first cooling device, the first coolant cooled by the first radiator may be supplied to the heat exchanger through the operation of the first water pump, the second coolant cooled by the second radiator may sequentially pass through the battery module and the chiller along the second coolant line and the third coolant line connected to each other through the operations of the second water pump and the third water pump, and may then be supplied to the heat exchanger, and the heat exchanger may condense the refrigerant by heat-exchanging the refrigerant with each of the first and second coolants.

When recovering an external heat source and waste heat generated from the electrical component in a heating mode of the vehicle, the first branch line may be selectively opened or closed through the operation of the first valve, in the first cooling device, the first coolant may be circulated to the electrical component through the operation of the first water pump, the third branch line may be closed and the second branch line may be opened while the connection between the second coolant line and the third coolant line is closed through the operation of the second valve, in the second cooling device, the second coolant may be circulated along the second coolant line and the opened second branch line through the operation of the second water pump, in the third cooling device, the operation of the third water pump may stop, in the air conditioner, the refrigerant line connecting the sub-condenser and the evaporator may be closed through the operation of the third expansion valve, the refrigerant connection line may be closed through the operation of the fourth expansion valve, the refrigerant branch line may be opened through the operation of the refrigerant valve, in the gas injection device, the operations of the first expansion valve and the gas-liquid separator may stop, the second expansion valve may expand the refrigerant supplied from the internal condenser and supply the expanded refrigerant to the heat exchanger connected through the refrigerant line, and the heat exchanger may recover the external heat source and the waste heat generated from the electrical component while evaporating the refrigerant supplied through the second expansion valve by heat-exchanging the first coolant whose temperature rises while cooling the electrical component with the second coolant whose temperature rises while recovering the external heat source.

When the gas injection device operates while recovering the external heat source and the waste heat generated from the electrical component in the heating mode of the vehicle, the first branch line may be selectively opened or closed through the operation of the first valve, in the first cooling device, the first coolant may be circulated to the electrical component through the operation of the first water pump, the third branch line may be closed and the second branch line may be opened while the connection between the second coolant line and the third coolant line is closed through the operation of the second valve, in the second cooling device, the second coolant may be circulated along the second coolant line and the opened second branch line through the operation of the second water pump, in the third cooling device, the operation of the third water pump may stop, in the air conditioner, the refrigerant line connecting the sub-condenser and the evaporator may be closed through the operation of the third expansion valve, the refrigerant connection line may be closed through the operation of the fourth expansion valve, the refrigerant branch line may be opened through the operation of the refrigerant valve, in the gas injection device, the first expansion valve may expand the refrigerant supplied from the supply unit and supply the expanded refrigerant to the gas-liquid separator, the gas-liquid separator may supply the gaseous refrigerant among the refrigerant supplied from the first expansion valve to the compressor through the open supply line, the second expansion valve may additionally expand the refrigerant supplied from the gas-liquid separator and supply the expanded refrigerant to the heat exchanger connected through the refrigerant line, and the heat exchanger may recover the external heat source and the waste heat generated from the electrical component while evaporating the refrigerant supplied through the second expansion valve by heat-exchanging the first coolant whose temperature rises while cooling the electrical component with the second coolant whose temperature rises while recovering the external heat source.

In the heating and dehumidifying mode of the vehicle, the first branch line may be selectively opened or closed through the operation of the first valve, in the first cooling device, the coolant may be circulated to the electrical component through the operation of the first water pump, the third branch line may be closed and the second branch line may be opened while the connection between the second coolant line and the third coolant line is closed through the operation of the second valve, in the second cooling device, the second coolant may be circulated along the second coolant line and the opened second branch line through the operation of the second water pump, the operation of the third cooling device may stop, in the air conditioner, the refrigerant line connecting the sub-condenser and the evaporator may be closed through the operation of the third expansion valve, the refrigerant connection line may be closed through the operation of the fourth expansion valve, the refrigerant branch line may be opened through the operation of the refrigerant valve, the refrigerant line connecting the heat exchanger and the sub-condenser may be closed through the operation of the refrigerant valve, in the gas injection device, the operations of the first expansion valve and the gas-liquid separator may stop, the second expansion valve may expand the refrigerant supplied from the internal condenser and supply the expanded refrigerant to the heat exchanger connected through the refrigerant line, and the heat exchanger may recover the waste heat generated from the electrical component while evaporating the refrigerant supplied through the second expansion valve by heat-exchanging the refrigerant with a coolant whose temperature rises while cooling the electrical component, and the dehumidifying line may be opened through the operation of the check valve so that a portion of the refrigerant expanded through the operation of the second expansion valve is supplied to the evaporator.

When cooling the electrical component and the battery module using the coolant, the first branch line may be closed through the operation of the first valve, the second branch line may be closed, the second valve may connect the second coolant line and the third coolant line, and close the third branch line; the first coolant cooled by the first radiator may be supplied to the electrical component along the first coolant line through the operation of the first water pump, the second coolant cooled by the second radiator may be supplied to the battery module along the second and third coolant lines through the operations of the second and third water pumps, and the operations of the air conditioner and the gas injection device may stop.

The first and fourth expansion valves may be a 2-way electronic expansion valve that selectively expands the refrigerant while controlling the flow of the refrigerant and has one inlet and one outlet.

The second expansion valve may be a 3-way electronic expansion valve that selectively expands the refrigerant while controlling the flow of the refrigerant and has two inlets and one outlet.

The heat exchanger may be a water-cooled heat exchanger, and the sub-condenser may be an air-cooled heat exchanger.

The electrical component may include a power control device, an inverter, an on board charger (OBC), a power conversion device, or an autonomous driving controller.

As described above, according to the heat pump system for a vehicle according to an embodiment of the present invention, it is possible to simplify a system by using one chiller in which a coolant and a refrigerant exchange heat with each other to control a temperature of a battery module according to a mode of the vehicle.

In addition, according to an embodiment of the present invention, it is possible to increase an entire travel distance of a vehicle by efficiently controlling a temperature of a battery module to exhibit optimal performance of the battery module and effectively managing the battery module.

In addition, according to an embodiment of the present invention, it is possible to improve heating efficiency by selectively using an external heat source or waste heat generated from an electrical component in a heating mode of a vehicle.

In addition, according to an embodiment of the present invention, it is possible to maximize heating performance by applying a gas injection device to selectively increase a flow rate of a refrigerant in a heating mode of a vehicle.

In addition, according to an exemplary embodiment of the present invention, it is possible to reduce the manufacturing cost, reduce the weight, and improve the space utilization by simplifying the entire system.

DETAILED DESCRIPTION OF ILLUSTRATIVE EMBODIMENTS

Figure 1:
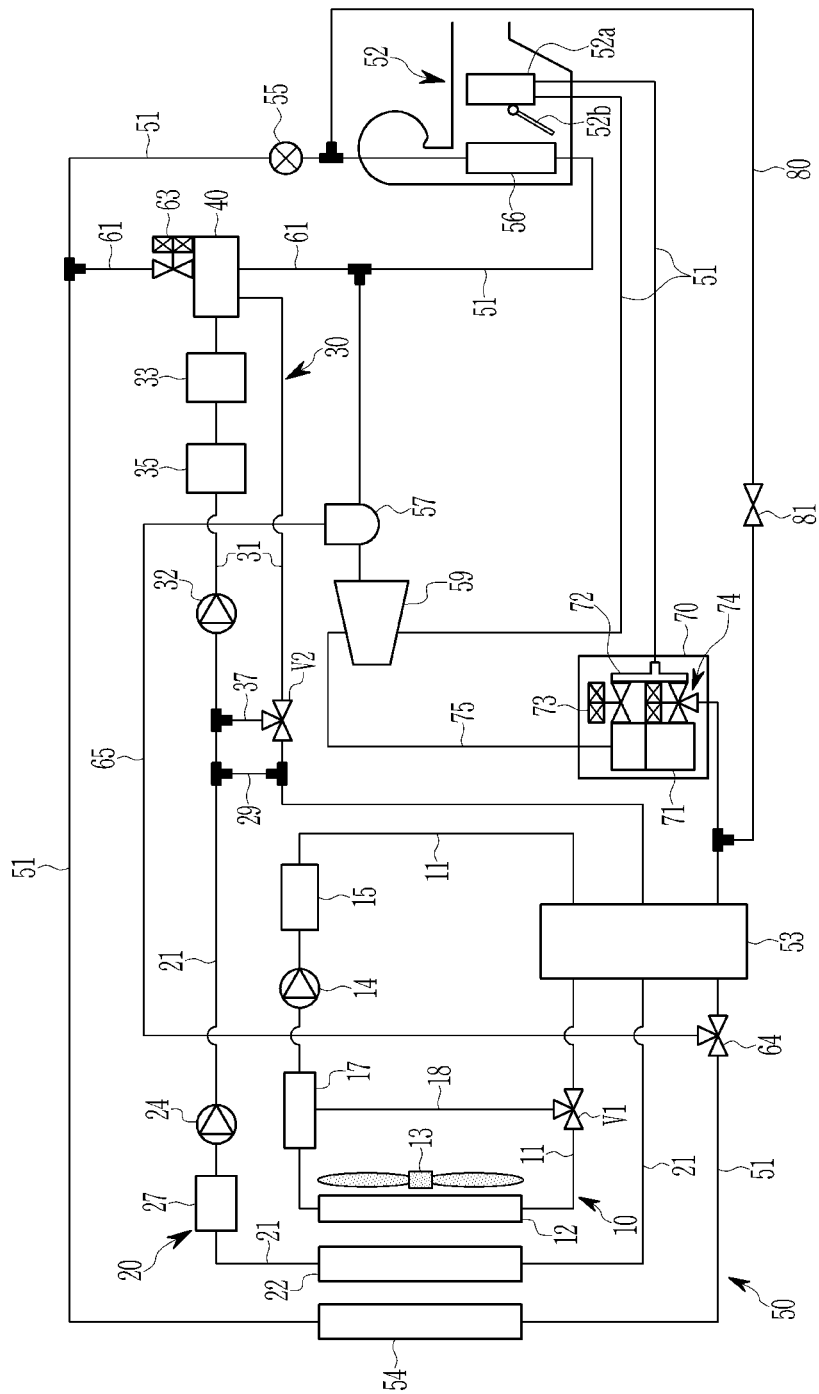
FIG. 1 is a block diagram of a heat pump system for a vehicle according to an exemplary embodiment of the present invention.

An exemplary embodiment of the present invention will hereinafter be described in detail with reference to the accompanying drawings.

Since exemplary embodiments stated in the present specification and configurations shown in the accompanying drawings are only exemplary embodiments of the present invention and do not represent the spirit of the present invention. Therefore, it is to be understood that various equivalents and modifications that may replace exemplary embodiments stated in the present specification and configurations shown in the accompanying drawings in a point in time at which the present invention is filed.

A description for contents that are not associated with the present invention will be omitted in order to clearly describe the present invention, and like reference numerals designate like elements throughout the specification.

Since sizes and thicknesses of the respective components were arbitrarily shown in the accompanying drawings for convenience of explanation, the present invention is not limited to contents shown in the accompanying drawings. In addition, thicknesses were exaggerated in order to obviously represent several portions and regions.

In addition, throughout the specification, unless explicitly described to the contrary, the word "comprise" and variations such as "comprises" or "comprising", will be understood to imply the inclusion of stated elements but not the exclusion of any other elements.

In addition, the terms "~unit", "~means", "~part", "member" described in the specification mean units of a comprehensive configuration for performing at least one function and operation.

FIG. 1 is a block diagram of a heat pump system for a vehicle according to an exemplary embodiment of the present invention.

The heat pump system for a vehicle according to an exemplary embodiment of the present invention may control a temperature of a battery module 33 by using a single chiller 40 in which a refrigerant and a coolant exchange heat with each other, and improve heating performance and efficiency by using an external heat source or waste heat generated from an electrical component 15 and a gas injection device 70.

Here, according to the heat pump system, in an electric vehicle, a first cooling device 10 for cooling the electric device 15, a second cooling device 20, and a third cooling device 30 for cooling the battery module 33, and an air conditioner 50, which is an air conditioning device for cooling and heating a room, may be interlocked.

That is, referring to FIG. 1, the heat pump system includes the first cooling device 10, the second cooling device 20, the third cooling device 30, the chiller 40, and the air conditioner 50, and the gas injection device 70.

First, the first cooling device 10 includes a first radiator 12, a first water pump 14, a first valve V1, and a first reservoir tank 17 that are connected on a first coolant line 11.

The first radiator 12 is disposed at a front of the vehicle, and a cooling fan 13 is provided at a rear thereof. Accordingly, the first radiator 12 cools a first coolant through an operation of the cooling fan 13 and heat exchange with external air.

In addition, the electrical component 15 may include an electric power control unit (EPCU), a motor, an inverter, an on board charger (OBC), an autonomous driving controller, or the like.

The electric power control unit, the inverter, the motor, or the autonomous driving controller may generate heat while driving, and the on board charger may generate heat when charging the battery module 33.

The electrical component 15 configured in this way may be provided on the first coolant line 11 and is cooled by a water cooling type.

That is, when waste heat generated from the electric device 15 is recovered in a heating mode of a vehicle, heat generated from the electric power control unit, the motor, the inverter, or the on board charger, or the autonomous driving controller may be recovered.

Meanwhile, a first reservoir tank 17 is provided on the first coolant line 11 between the first radiator 12 and the electrical component 15. The first coolant cooled by the first radiator 12 may be stored in the first reservoir tank 17.

The first cooling device 10 configured in this way circulates the first coolant on the first coolant line 11 so that the first coolant is supplied to the electrical component 15 provided on the first coolant line 11.

That is, the first cooling device 10 circulates the first coolant cooled by the first radiator 12 through the operation of the first water pump 14 along the first coolant line 11, and thus, cools the electrical component 15 so that the electrical component 15 is not overheated.

In the present exemplary embodiment, the second cooling device 20 may include a second radiator 22 and a second water pump 24 connected to a second coolant line 21.

The second cooling device 20 may circulate the first coolant cooled by the second radiator 22 on the second coolant line 21 through the operation of the second water pump 24.

Here, the second radiator 22 may be disposed in front of the first radiator 12, and may cool the second coolant through the operation of the cooling fan 13 and heat exchange with external air.

Meanwhile, in the present exemplary embodiment, it will be described as an example that the second radiator 22 is disposed in front of the first radiator 12, but the present exemplary embodiment is not limited thereto, and the first and second radiators 12 and 22 may be disposed on the same line or may be integrally configured.

In addition, a second reservoir tank 27 is provided on the second coolant line 21 between the second radiator 22 and the second water pump 24. The second coolant cooled by the second radiator 22 may be stored in the second reservoir tank 27.

The second cooling device 20 configured in this way may circulate the second coolant through the operation of the second water pump 24.

In the present exemplary embodiment, the third cooling device 30 includes a third coolant line 31 selectively connected to the second coolant line 21 and a second valve V2, and a third water pump 32 and a battery module 33 provided on the third coolant line 31.

The third cooling device 30 may circulate the second coolant to the battery module 33 through the operation of the third water pump 32.

Here, the second valve V2 may selectively connect the second coolant line 21 and the third coolant line 31 between the second radiator 22 and the battery module 33.

In more detail, the second valve V2 selectively connects the second coolant line 21 and the third coolant line 31 between the battery module 33 and the second radiator 22 provided on the third coolant line 31 based on a flow direction of the second coolant.

Here, the battery module 33 supplies power to the electrical component 15, and is formed in a water cooling type in which the battery module 33 is cooled by the second coolant flowing along the third coolant line 31.

That is, the battery module 33 is selectively connected to the third coolant line 31 through the second cooling device 20 according to the operation of the second valve V2. In addition, the second coolant may be circulated into the battery module 33 through the operation of the third water pump 32 provided on the third coolant line 31.

The third water pump 32 is provided on the third coolant line 31. The third water pump 32 may operate to circulate the second coolant on the third coolant line 31.

Here, the first, second, and third water pumps 14, 24, and 32 may be an electric water pump.

Meanwhile, the first cooling device 10 may include a first branch line 18 connected to the first coolant line 11 between the first radiator 12 and the first water pump 14 through the first valve V1 provided on the first coolant line 11 between the first radiator 12 and the first water pump 14.

In more detail, the first valve V1 is provided on the first coolant line 11 between the electrical component 15 and the first radiator 12.

One end of the first branch line 18 may be connected to the first coolant line 11 through the first valve V1, and the other end of the first branch line 18 may be connected to the first reservoir tank 17.

The first branch line 18 is selectively opened through the operation of the first valve V1 when the temperature of the coolant increases by absorbing the waste heat generated from the electrical component 15. In this case, the first coolant line 11 connected to the first radiator 12 is closed through the operation of the first valve V1.

That is, when the first branch line 18 recovers the waste heat generated from the electrical component 15, the coolant passing through the electrical component 15 may be selectively opened through the operation of the first valve V1 to be supplied back to the electrical component 15 without passing through the first radiator 12.

In the present exemplary embodiment, the chiller 40 is provided on the third coolant line 31, and the second coolant may be selectively circulated therein.

The chiller 40 is connected through a refrigerant line 51 of the air conditioner 50 through a refrigerant connection line 61. That is, the chiller 40 may be a water-cooled heat exchanger into which the second coolant is introduced.

Accordingly, the chiller 40 may heat-exchange the second coolant selectively introduced through the third coolant line 31 with the refrigerant selectively supplied from the air conditioner 50 to control the temperature of the second coolant.

Meanwhile, the second cooling device 20 is provided with a second branch line 29 that separates the second coolant line 21 and the third coolant line 31.

The second branch line 29 may be selectively connected to the second coolant line 21 so that the second cooling device 20 forms an independent closed circuit through the second coolant line 21.

Meanwhile, a separate valve may be provided at a position where the second branch line 29 is connected to the second coolant line 21 or on the second branch line 29. Such valves may be a 3-Way or 2-Way valve.

Further, a third branch line 37 connected to the third coolant line 31 through the second valve V2 to form a closed circuit independent of the second cooling device 20 is provided in the third cooling device 30.

When the third branch line 37 recovers the waste heat generated from the battery module 33 or increases the temperature of the battery module 33, the second coolant passing through the battery module 33 may be selectively opened and closed through the operation of the second valve V2 so as to be supplied back to the battery module 33 without passing through the second radiator 22.

That is, the second valve V2 is provided between the second coolant line 21 and the third coolant line 31, and may selectively connect the second coolant line 21 and the third coolant line 31.

On the other hand, the second valve V2 may block the connection between the second coolant line 21 and the third coolant line 31 and open the third branch line 37.

When the third branch line 37 is opened, the third cooling device 30 may be separated from the second cooling device 20 to form an independent closed circuit.

Here, the first valve V1 and the second valve V2 may control the flow of the first and second coolants in the first, second, and third cooling devices 10, 20, and 30 through the opening/closing control of the first and second branch lines 18 and 37.

First, when the first valve V1 cools the electrical component 15 using the first coolant cooled by the first radiator 12, the first valve V1 may open the first coolant line 11 connected to the first radiator 12 and close the first branch line 18.

Then, the first coolant cooled by the first radiator 12 may be circulated along the first coolant line 11 connected through the operation of the first valve V1 to cool the electrical component 15.

On the other hand, when the first valve V1 recovers the waste heat generated from the electrical component 15, the first valve V1 may close the first coolant line 11 connected to the first radiator 12 and open the first branch line 18.

Then, the temperature of the first coolant circulated in the first cooling device 10 may increase while passing through the electrical component 15 along the opened first coolant line 11 and first branch line 18 without passing through the first radiator 12.

In addition, the second valve V2 may selectively connect the second coolant line 21 and the third coolant line 31 or selectively connect the third coolant line 31 and the third branch line 37 to control the flow of the coolant.

That is, when the second valve V2 cools the battery module 33 using the second coolant cooled by the second radiator 22, the second valve V2 may connect the second coolant line 21 and the third coolant line 31 connected to the second radiator 22 and close the third branch line 37.

Then, the second coolant cooled by the second radiator 22 may cool the battery module 33 while flowing along the second coolant line 21 and the third coolant line 31 connected through the operation of the second valve V2.

In addition, the second valve V2 may open the third branch line 37 and close the connection between the second coolant line 21 and the third coolant line 31 when cooling the battery module 33 using the second coolant heat-exchanged with the refrigerant in the chiller 40.

Accordingly, the low-temperature second coolant that has completed the heat exchange with the refrigerant in the chiller 40 is introduced into the battery module 33 through the second branch line 37 opened by the second valve V2, so it is possible to efficiently cool the battery module 33.

On the other hand, when the temperature of the battery module 33 increases, the second coolant circulating along the third coolant line 31 through the operation of the second valve V2 may be prevented from being introduced into the second radiator 22, so it is also possible to quickly increase the temperature of the battery module 33.

Here, the third cooling device 30 may further include a coolant heater 35 provided on the third coolant line 31 between the third water pump 32 and the battery module 33.

The coolant heater 35 is selectively turned ON when the temperature of the battery module 33 needs to increase to heat the second coolant circulated on the third coolant line 31, thereby introducing the coolant whose temperature rises into the battery module 33.

The coolant heater 35 may be an electric heater that operates according to the supply of power.

That is, the coolant heater 35 may operate when the temperature of the second coolant supplied to the battery module 33 is lower than a target temperature to heat the second coolant circulated on the third coolant line 31.

Accordingly, the second coolant whose temperature rises while passing through the coolant heater 35 may be supplied to the battery module 33, so it is possible to increase the temperature of the battery module 33.

Therefore, the coolant heater 35 may selectively operate even when increasing the temperature of the battery module 33.

Meanwhile, in the present exemplary embodiment, it will be described as an example that the valve is not configured in the second branch line 27, but the present exemplary embodiment is not limited thereto, and it is possible to apply the valve, if necessary, for the selective opening of the second branch line 27.

That is, since the flow rate of the coolant circulated through the operations of the second coolant line 21, the third coolant line 31, and the second branch line 37, which are selectively connected according to respective modes (heating, cooling, and dehumidifying) of the vehicle, and through the operations of the second and third water pumps 24 and 32, may be controlled, and the opening/closing control of the third branch line 39 may be possible without applying a valve.

In the present exemplary embodiment, the air conditioner 50 includes a heating, ventilation, and air conditioning (HVAC) module 52) connected through the refrigerant line 51, a heat exchanger 53, a sub-condenser 54, a third expansion valve 55, an evaporator 56, an accumulator 57, a compressor 59, a fourth expansion valve 63, and a dehumidifying line 80.

First, the HVAC module 52 includes the evaporator 56 connected through the refrigerant line 51 and an opening/closing door 52b for controlling external air passing through the evaporator 56 to be selectively introduced into an internal condenser 52a according to the cooling, heating, and heating/dehumidifying modes of the vehicle.

That is, in the heating mode of the vehicle, the opening/closing door 52b is opened so that the external air passing through the evaporator 56 is introduced into the internal condenser 52a. On the other hand, in the cooling mode of the vehicle, the opening/closing door 52b closes the internal condenser 52a side so that the external air cooled while passing through the evaporator 56 is directly introduced into the interior of the vehicle.

In the present exemplary embodiment, the heat exchanger 53 is connected to the refrigerant line 51 through which the refrigerant passes. In addition, the heat exchanger 53 may be connected to the first and second coolant lines 11 and 21, respectively, so that each of the first and second coolants circulating the first and second cooling devices 10 and 20 pass through.

The heat exchanger 53 may additionally condense or evaporate the refrigerant condensed in the internal condenser 52a by heat-exchanging the refrigerant with the first coolant and the second coolant supplied through the first and second coolant lines 11 and 21 or any one of the first and second coolants according to the selective operation of the gas injection device 70 according to the heating, cooling, and dehumidifying modes of the vehicle.

That is, the heat exchanger 53 may be a water-cooled heat exchanger into which the first and second coolants are introduced.

In the present exemplary embodiment, the sub-condenser 54 may be provided on the refrigerant line 51 between the heat exchanger 53 and the evaporator 56.

Here, the sub-condenser 54 may additionally condense the refrigerant condensed in the heat exchanger 53 by heat-exchanging the refrigerant with the external air. That is, the sub-condenser 54 is disposed in front of the second radiator 12 to exchange heat between the refrigerant introduced thereinto with the external air.

That is, the sub-condenser 54 may be an air-cooled heat exchanger that condenses the refrigerant using external air.

As such, when the heat exchanger 53 condenses the refrigerant, the sub-condenser 54 may additionally condense the refrigerant condensed in the heat exchanger 53 to increase the sub-cooling of the refrigerant, so it is possible to improve a coefficient of performance (COP) which is a coefficient of cooling capacity compared to power required for the compressor.

The third expansion valve 55 is provided on the refrigerant line 51 between the sub-condenser 54 and the evaporator 56. The third expansion valve 55 receives the refrigerant passing through the sub-condenser 54 and selectively expands the refrigerant.

The accumulator 57 is provided on the refrigerant line 51 between the evaporator 56 and the compressor 59, and is connected to the refrigerant connection line 61.

The accumulator 57 supplies only the gaseous refrigerant to the compressor 59 to improve efficiency and durability of the compressor 59.

In the present exemplary embodiment, one end of the refrigerant connection line 61 is connected to the refrigerant line 51 between the sub-condenser 54 and the third expansion valve 55. The other end of the refrigerant connection line 61 may be connected to the refrigerant line 51 connected to the accumulator 57.

Here, the accumulator 57 may supply a gaseous refrigerant among the refrigerants supplied through the refrigerant connection line 61 to the compressor 59.

Meanwhile, the fourth expansion valve 63 may be provided on the refrigerant connection line 61.

The fourth expansion valve 63 may expand the refrigerant introduced through the refrigerant connection line 61 and introduce the expanded refrigerant into the chiller 40 when cooling the battery module 33 using the second coolant heat-exchanged with the refrigerant.

That is, the fourth expansion valve 63 may expand the refrigerant discharged from the sub-condenser 54 and introduce the expanded refrigerant into the chiller 40 while the temperature is lowered, thereby further lowering a water temperature of the coolant passing through the inside of the chiller 40.

Accordingly, the second coolant whose water temperature is lowered while passing through the chiller 40 is introduced into the battery module 33, and thus, the battery module 122 may be cooled more efficiently.

The compressor 59 is connected between the internal condenser 52a and the heat exchanger 53 through the refrigerant line 51. The compressor 59 may compress the gaseous refrigerant and supply the compressed refrigerant to the heat exchanger 53.

Meanwhile, the air conditioner 50 may further include a refrigerant branch line 65 through which the refrigerant discharged from the heat exchanger 53 is selectively directly introduced into the accumulator 57 through the operation of the refrigerant valve 64 provided on the refrigerant line 51 between the heat exchanger 53 and the sub-condenser 54.

One end of the refrigerant branch line 65 is connected to the refrigerant valve 64. The other end of the refrigerant branch line 65 may be connected to the accumulator 57.

Here, the refrigerant valve 64 may open the refrigerant branch line 65 in the heating mode of the vehicle and close the refrigerant line 51 connected to the sub-condenser 54.

On the other hand, the refrigerant valve 64 may close the refrigerant branch line 65 in the cooling mode of the vehicle and open the refrigerant line 51 connected to the sub-condenser 54.

In the present exemplary embodiment, one end of the dehumidifying line 80 is connected to the refrigerant line 51 between the internal condenser 52a and the heat exchanger 53.

The other end of the dehumidifying line 80 is connected to the refrigerant line 11 between the evaporator 56 and the third expansion valve 55. Here, the dehumidifying line 80 may be provided with a check valve 81.

That is, the dehumidifying line 80 may be opened through the operation of the check valve 81 in the dehumidifying mode of the vehicle.

The heat pump system according to the present exemplary embodiment may further include the gas injection device 70.

The gas injection device 70 is provided in the air conditioner 50. The gas injection device 70 may selectively expand the refrigerant supplied from the internal condenser 52a and supply the expanded refrigerant to the heat exchanger 53.

In addition, the gas injection device 70 selectively supplies a portion of the refrigerant supplied from the internal condenser 52a to the compressor 59 to increase the flow rate of the refrigerant circulated on the refrigerant line 51.

The gas injection device 70 configured in this way may selectively operate in the heating mode of the vehicle.

Here, the gas injection device 70 includes a gas-liquid separator 71, a supply unit 72, a first expansion valve 73, a second expansion valve 74, and a supply line 75.

First, the gas-liquid separator 71 may separate a gas refrigerant and a liquid refrigerant among the refrigerants introduced thereinto and selectively discharge the separated gas and liquid refrigerants.

The supply unit 72 may be connected through the internal condenser 52a and the refrigerant line 51 so that the refrigerant supplied from the internal condenser 52a is introduced.

In the present exemplary embodiment, the first expansion valve 73 may be provided between the gas-liquid separator 71 and the supply unit 72 to selectively expand the refrigerant supplied to the supply unit 72 and supply the expanded refrigerant to the gas-liquid separator 71.

The second expansion valve 74 may selectively expand the refrigerant supplied to the supply unit 72 and supplies the expanded refrigerant to the heat exchanger 53, or may be provided between the gas-liquid separator 71 and the supply unit 72 to supply the refrigerant supplied from the gas-liquid separator 71 to the heat exchanger 53.

Here, the second expansion valve 74 may be a 3-way electronic expansion valve that selectively expands the refrigerant while controlling the flow of the refrigerant and has two inlets and one outlet.

The supply line 75 connects the gas-liquid separator 71 and the compressor 59. The supply line 75 may selectively supply the gaseous refrigerant from the gas-liquid separator 71 to the compressor 59 when the refrigerant is supplied to the gas-liquid separator 71.

That is, the supply line 75 may connect the gas-liquid separator 71 and the compressor 59 so that the gas refrigerant separated in the gas-liquid separator 71 is selectively introduced into the compressor 59.

Meanwhile, when the gas injection device 70 operates in the heating mode of the vehicle, the first expansion valve 73 may expand the refrigerant supplied from the internal condenser 52a through the supply unit 72 and supply the expanded refrigerant to the gas-liquid separator 71.

Here, the supply line 75 is opened. In addition, the gas-liquid separator 71 may supply the gaseous refrigerant among the refrigerants introduced thereinto to the compressor 59 through the opened supply line 75.

In addition, the second expansion valve 74 may expand the refrigerant supplied from the gas-liquid separator 71 and flow the expanded refrigerant into the refrigerant line 51.

On the other hand, when the gas injection device 70 does not operate in the heating mode of the vehicle, the operation of the first expansion valve 73 stops.

Accordingly, the introduction of the refrigerant into the gas-liquid separator 71 may be blocked.

In addition, the second expansion valve 74 may expand the refrigerant supplied from the internal condenser 52a through the supply unit 72 and supply the expanded refrigerant to the heat exchanger 53.

Also, when the vehicle is in the cooling mode or the dehumidifying mode, the operation of the first expansion valve 73 in the gas injection device 70 may stop.

Accordingly, the introduction of the refrigerant into the gas-liquid separator 71 may be blocked.

In addition, the second expansion valve 74 may flow the refrigerant supplied from the internal condenser 52a through the supply unit 72 through the refrigerant line 51 while expanding the refrigerant.

Here, the heat exchanger 53 may additionally condense or evaporate the refrigerant supplied from the internal condenser 52a or the refrigerant discharged from the gas-liquid separator 71 by heat-exchanging the refrigerant with the external air according to the selective operation of the fourth expansion valve 74.

When the heat exchanger 53 condenses the refrigerant, the heat exchanger 53 may additionally condense the refrigerant condensed in the internal condenser 52a to increase the sub-cooling of the refrigerant, so it is possible to improve the coefficient of performance (COP) which is the coefficient of cooling capacity compared to power required for the compressor.

That is, in the cooling mode of the vehicle, the refrigerant passing through the internal condenser 52a may be directly supplied to the heat exchanger 53 by the operation of the fourth expansion valve 74 without passing through the gas-liquid separator 71.

By this operation, the pressure of the refrigerant circulated along the refrigerant line 51 in the cooling mode of the vehicle may be reduced, and the cooling performance of the interior of the vehicle may be improved.

Meanwhile, in the present exemplary embodiment, the first expansion valve 73 and the fourth expansion valve 63 may be a 2-way electronic expansion valve that selectively expands the refrigerant while controlling the flow of the refrigerant passing through the refrigerant line 51 or the refrigerant connection line 61 and has one inlet and one outlet.

In addition, the first and second valves V1 and V2 and the refrigerant valve 64 may be a 3-way valve capable of distributing a flow rate.

Hereinafter, operations and actions of a heat pump system for a vehicle according to an exemplary embodiment of the present invention configured as described above will be described in detail with reference to FIGS. 2 to 6.

Hereinafter, in the heat pump system for a vehicle according to the exemplary embodiment of the present invention, the operation of cooling the electrical component 15 and the battery module 33 using the coolant will be described with reference to FIG. 2.

Figure 2:
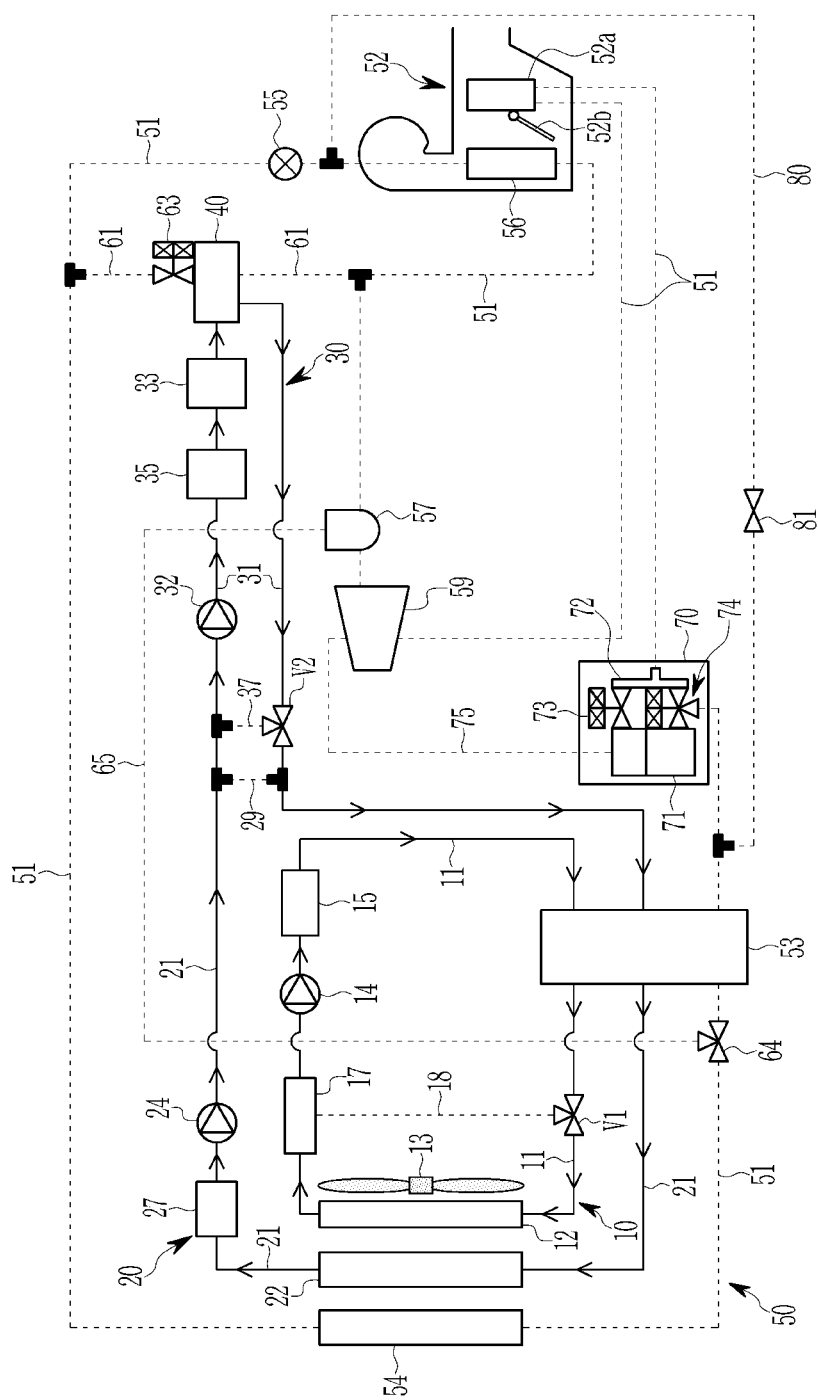
FIG. 2 is an operation state diagram for cooling an electrical component and a battery module using a coolant in the heat pump system for a vehicle according to the exemplary embodiment of the present invention.

FIG. 2 is an operation state diagram for cooling an electrical component and a battery module using a coolant in the heat pump system for a vehicle according to the exemplary embodiment of the present invention.

Referring to FIG. 2, the first branch line 18 is closed through the operation of the first valve V1.

The second valve V2 connects the second coolant line 21 and the third coolant line 31, and closes the third branch line 37. The second branch line 39 is closed.

In this state, in the first cooling device 10, the first water pump 14 operates to cool the electrical component 15. Accordingly, the first coolant cooled by the first radiator 12 and stored in the first reservoir tank 17 is supplied to the electrical component 15.

Accordingly, the electrical component 15 may be efficiently cooled.

In the second cooling device 20 and the third cooling device 30, the second and third water pumps 24 and 32 operate to cool the battery module 33.

Then, the second coolant cooled by the second radiator 22 and stored in the second reservoir tank 27 is supplied to the battery module 33 while being circulated along the second and third coolant lines 21 and 31 by the operation of the second and third water pumps 24 and 32.

The second coolant that has cooled the battery module 33 is introduced back into the second radiator 22 along the third coolant line 31 and the second coolant line 21.

That is, since the low-temperature second coolant cooled by the second radiator 22 cools only the battery module 33, it is possible to effectively cool the battery module 33.

In this way, the first and second coolants cooled by the first and second radiators 12 and 22 and stored in the first and second reservoir tanks 17 and 27, respectively, cool the electrical component 15 and the battery module 33, respectively, while circulating the first coolant line 11, the second coolant line 21, and the third coolant line 31 through the operations of the third water pumps 14, 24, and 32, so it is possible to efficiently cool the electrical component 15 and the battery module 33.

Here, the air conditioner 50 and the gas injection device 70 do not operate.

Meanwhile, the present exemplary embodiment describes cooling both the electrical component 15 and the battery module 33 with the first coolant and the second coolant cooled by the first and second radiators 12 and 22, respectively, but is not limited thereto.

That is, when cooling any one of the electrical component 15 and the battery module 33 separately, the first water pump 14 or the second and third water pumps 24 and 32 may selectively operate.

An operation of cooling the battery module 33 in the cooling mode of the vehicle will be described with reference to FIG. 3.

Figure 3:
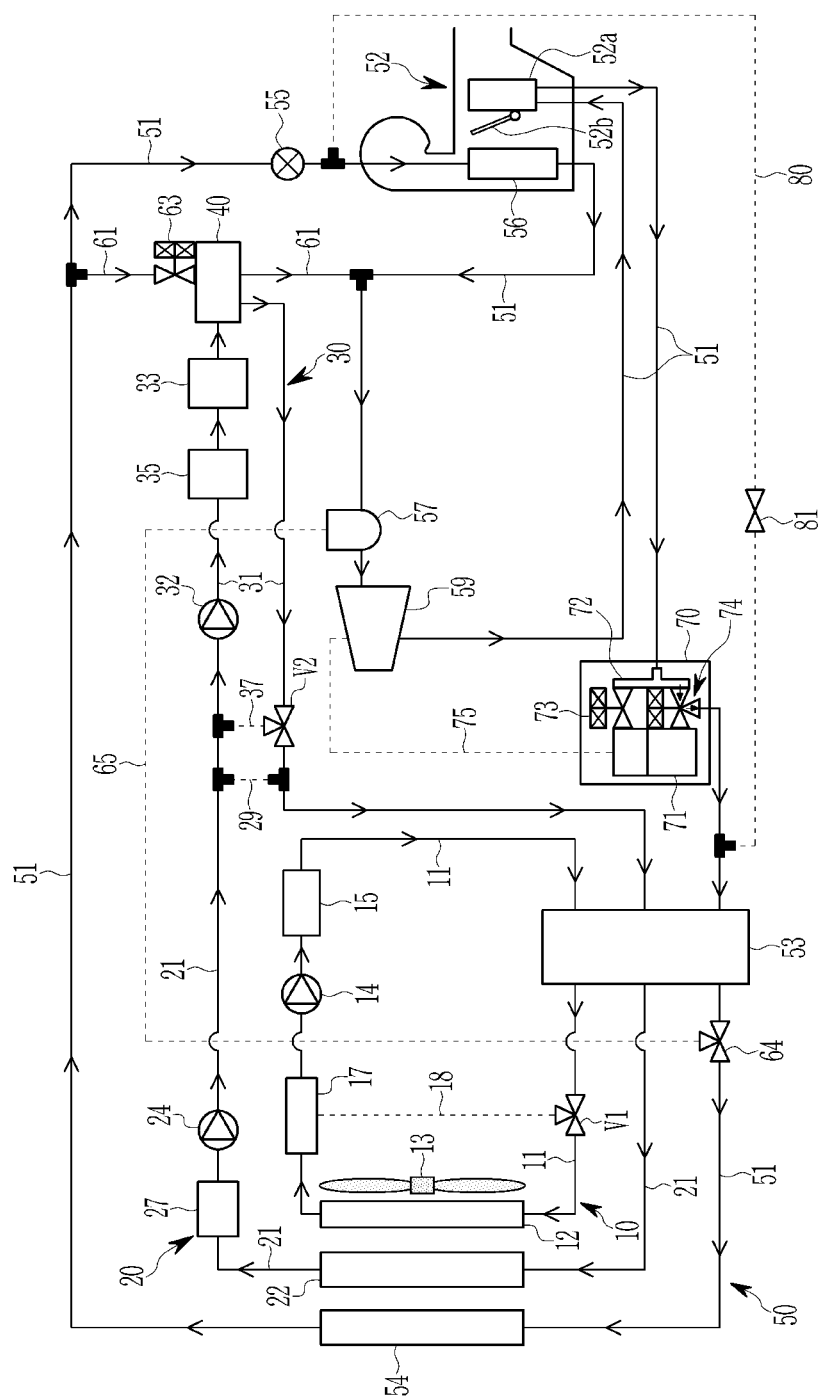
FIG. 3 is an operation state diagram for cooling a battery module using a refrigerant in a cooling mode of a vehicle in the heat pump system for a vehicle according to the exemplary embodiment of the present invention.

FIG. 3 is an operation state diagram for cooling a battery module using a refrigerant in a cooling mode of a vehicle in the heat pump system for a vehicle according to the exemplary embodiment of the present invention.

Referring to FIG. 3, in the first cooling device 10, the first water pump 14 operates to cool the electrical component 15 and the heat exchanger 53. Accordingly, the first coolant cooled by the first radiator 12 is circulated to the electrical component 15 and the heat exchanger 53.

Here, the first branch line 18 is closed through the operation of the first valve V1.

That is, in the first cooling device 10, the first coolant cooled by the first radiator 12 may be supplied to the electrical component 15 and the heat exchanger 53 through the operation of the first water pump 14.

In the second cooling device 20, the second water pump 24 operates to supply the second coolant to the heat exchanger 53.

Meanwhile, the second branch line 29 is closed. In addition, the third branch line 37 is opened through the operation of the second valve V2.

Accordingly, the second coolant line 21 is connected to the third coolant line 31 through the operations of the closed second and third branch lines 29 and 37 and the second valve V2.

Accordingly, in the second cooling device 20 and the third cooling device 30, the second coolant is circulated along the second coolant line 21 and the third coolant line 31 through the operations of the second water pump 24 and the third water pump 32.

Accordingly, the second coolant cooled by the second radiator 22 is circulated on the second coolant line 21 and the third coolant line 31 to cool the heat exchanger 53 through the operations of the second and third water pumps 24 and 32.

That is, the second coolant cooled by the second radiator 22 may be supplied to the battery module 33 and the heat exchanger 53 through the operations of the second water pump 24 and the third water pump 32.

Here, the second coolant passing through the chiller 40 may pass through the heat exchanger 53 and the second radiator 22 along the third coolant line 31 and the second coolant line 21 and may then be supplied back to the battery module 33.

In the air conditioner 50, each component operates to cool the interior of the vehicle. Accordingly, the refrigerant is circulated along the refrigerant line 51.

Here, the refrigerant branch line 65 is closed through the operation of the refrigerant valve 64. Also, the refrigerant valve 64 may open the refrigerant line 51 connected to the sub-condenser 54 so that the heat exchanger 53 is connected to the sub-condenser 54.

The refrigerant line 51 connecting the sub-condenser 54 and the evaporator 16 is opened through the operation of the third expansion valve 55. The refrigerant connection line 61 is opened through the operation of the fourth expansion valve 63.

Then, the refrigerant passing through the sub-condenser 54 may be circulated along the refrigerant line 51 and the refrigerant connection line 61.

Here, the third and fourth expansion valves 55 and 63 may expand the refrigerant so that the expanded refrigerant is supplied to the evaporator 56 and the chiller 40, respectively.

The sub-condenser 54 may additionally condense the refrigerant introduced from the heat exchanger 53 by heat-exchanging the refrigerant with the external air.

In addition, the heat exchanger 53 condenses the refrigerant using the first and second coolants flowing along the first and second coolant lines 11 and 21.

Meanwhile, the second coolant passing through the chiller 40 is cooled by exchanging heat with the expanded refrigerant supplied to the chiller 40.

The second coolant cooled by the chiller 40 sequentially passes through the heat exchanger 53 and the second radiator 22, and then is supplied to the battery module 33. Accordingly, the battery module 33 is efficiently cooled by the cooled second coolant.

That is, the fourth expansion valve 63 expands a portion of the refrigerant passing through the sub-condenser 54 to supply the expanded refrigerant to the chiller 40, and opens the refrigerant connection line 61.

Accordingly, a portion of the refrigerant discharged from the sub-condenser 54 is expanded through the operation of the second expansion valve 63 to become a low-temperature and low-pressure state, and is introduced into the chiller 40 connected to the refrigerant connection line 61.

Then, the refrigerant introduced into the chiller 40 exchanges heat with the second coolant, passes through the accumulator 57 through the refrigerant connection line 61, and is then introduced into the compressor 59.

The second coolant whose temperature rises while cooling the battery module 33 is cooled by heat-exchanging with the low-temperature and low-pressure refrigerant in the chiller 40.

The cooled second coolant passes through the heat exchanger 53 and the second radiator 22 along the third coolant line 31 and the second coolant line 21, and is then supplied back to the battery module 33.

That is, the second coolant may efficiently cool the battery module 33 while repeatedly performing the above-described operation.

Meanwhile, the remaining refrigerant discharged from the sub-condenser 54 flows through the refrigerant line 51 to cool the interior of the vehicle, and sequentially passes through the third expansion valve 55, the evaporator 56, the accumulator 57, the compressor 59, the internal condenser 52a, and the heat exchanger 53.

Here, the external air introduced into the HVAC module 52 is cooled by the refrigerant, which is introduced into the evaporator 56 and is in a low-temperature state, while passing through the evaporator 56.

In this case, the opening/closing door 52b closes a portion passing through the internal condenser 52a so that the cooled external air does not pass through the internal condenser 52a. Therefore, the cooled external air is directly introduced into the interior of the vehicle, thereby making it possible to cool the interior of the vehicle.

Meanwhile, the refrigerant having an increased amount of condensation is expanded and supplied to the evaporator 56 while sequentially passing through the internal condenser 52a, the heat exchanger 53, and the sub-condenser 54, thereby evaporating the refrigerant to a lower temperature.

That is, in the present exemplary embodiment, the internal condenser 52a primarily condenses the refrigerant by heat-exchanging the refrigerant with the external air, and the heat exchanger 53 secondarily condenses the refrigerant by heat-exchanging the refrigerant with the first and second coolants and then, the sub-condenser 54 additionally condenses the refrigerant by heat-exchanging the refrigerant with the external air, so it is advantageous to form the sub-cool of the refrigerant.

As the refrigerant having the sub-cool is evaporated to a lower temperature in the evaporator 56, the temperature of the external air passing through the evaporator 56 may be further lowered, thereby improving the cooling performance and efficiency.

Meanwhile, in the gas injection device 70, the second expansion valve 74 may supply the refrigerant supplied from the internal condenser 52a to the heat exchanger 53 without expanding the refrigerant.

While repeatedly performing the above-described process, the refrigerant may cool the interior of the vehicle in the cooling mode and at the same time pass through the chiller 40 to cool the second coolant through the heat exchange.

The low-temperature coolant cooled by the chiller 40 is introduced into the battery module 33. Accordingly, the battery module 33 may be efficiently cooled by the supplied low-temperature coolant.

In the present exemplary embodiment, the operation of recovering the external heat source and the waste heat generated from the electrical component 15 in the heating mode of the vehicle will be described with reference to FIG. 4.

Figure 4:
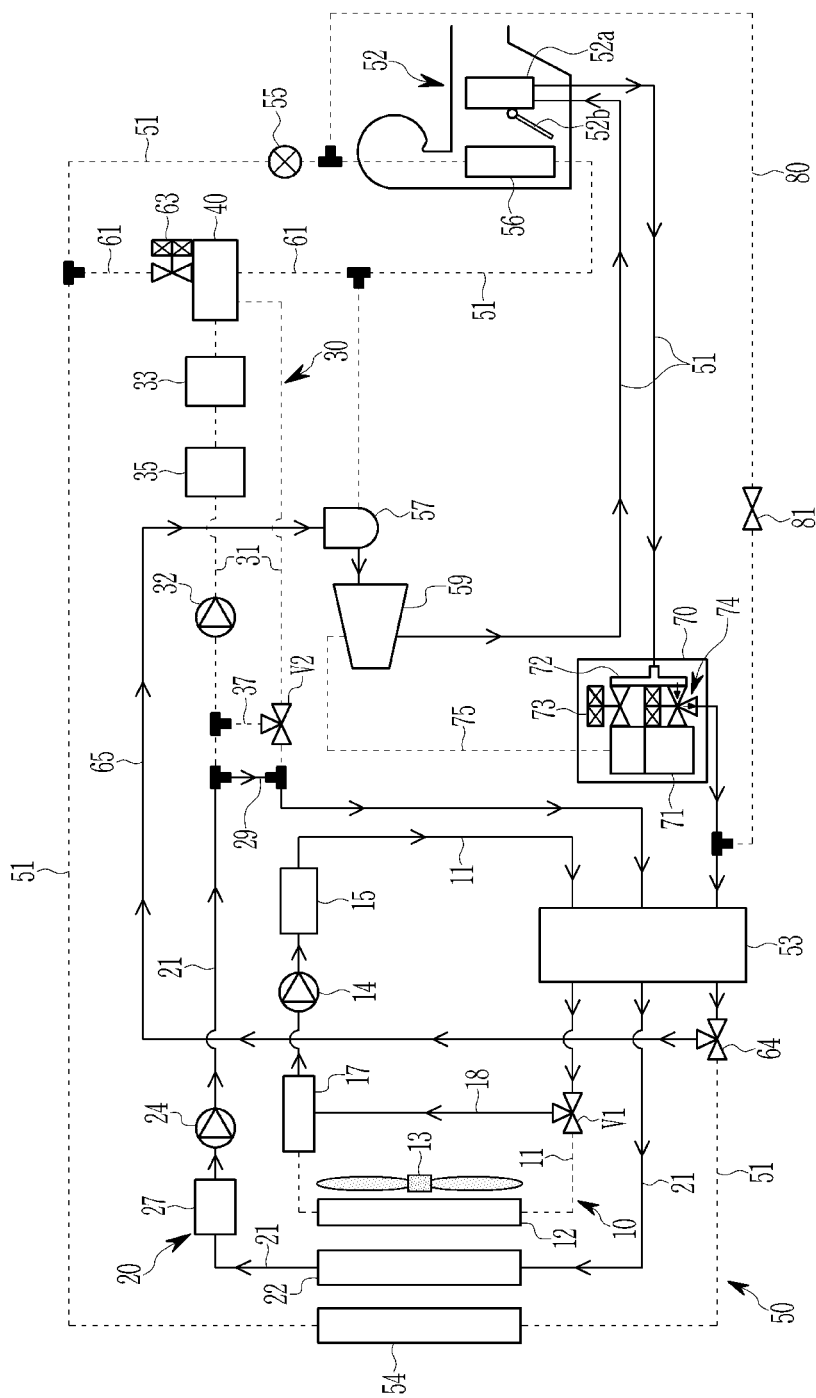
FIG. 4 is an operation state diagram for recovery of the external heat source and the waste heat generated from the electrical component according to a heating mode in the heat pump system for a vehicle according to the exemplary embodiment of the present invention.

FIG. 4 is an operation state diagram for recovery of the external heat source and the waste heat generated from the electrical component according to a heating mode in the heat pump system for a vehicle according to the exemplary embodiment of the present invention.

Referring to FIG. 4, the heat pump system may absorb the external heat source from the external air together with the waste heat generated from the electrical component 15.

First, in the cooling device 10, the first water pump 14 operates to circulate the first coolant.

Here, the first branch line 18 may be selectively opened or closed through the operation of the first valve V1.

That is, when the amount of heat generated by the electrical component 15 is small, the first valve V1 opens the first branch line 18 and closes the first coolant line 11 that connects the electrical component 15 and the first radiator 12.

Accordingly, the first coolant passing through the electrical component 15 continues to circulate along the first coolant line 11 without passing through the first radiator 12 and recovers the waste heat from the electrical component 15, so the temperature of the first coolant increases.

The first coolant whose temperature rises is supplied to the heat exchanger 53. In this case, the heat exchanger 53 may recover the waste heat generated from the electrical component 15 from the coolant whose temperature rises.

On the other hand, when the electrical component 15 is overheated, the first valve V1 closes the first branch line 18 and opens the first coolant line 11 that connects the electrical component 15 and the first radiator 12.

Accordingly, the first coolant passing through the electrical component 15 is circulated along the first coolant line 11 and is cooled by the first radiator 12. The first coolant cooled by the first radiator 12 cools the overheated electrical component 15, thereby preventing the electrical component 15 from being overheated any longer.

Meanwhile, in the second cooling device 20, the second water pump 24 operates to supply the second coolant to the heat exchanger 53.

Here, the second branch line 29 is opened. At the same time, the third branch line 37 is closed while the second coolant line 21 and the third coolant line 31 are not connected through the operation of the second valve V2.

That is, in the second cooling device 20, the opened second branch line 29 may be connected to the second coolant line 21, and the closed circuit through which the coolant circulates independently of the third cooling device 30 may be formed.

Meanwhile, in the third cooling device 30, the second coolant is not circulated by the third water pump 32 whose operation stops.

Accordingly, the second coolant passing through the second radiator 22 may be circulated along the second coolant line 21 and the second branch line 29 through the operation of the second water pump 24.

Here, the second coolant passing through the second coolant line 21 respectively absorbs the external heat source while passing through the second radiator 22, so the temperature of the second coolant increases. The second coolant whose temperature rises is supplied to the heat exchanger 53.

That is, in the first and second cooling devices 10 and 20, the first and second coolants whose temperature rises by the external heat source and the waste heat generated from the electrical component 15 pass through the heat exchanger 53 through the operation of the first and second water pumps 14 and 24.

In this case, the heat exchanger 53 may recover the external heat source and the waste heat generated from the electrical component 15 while heat-exchanging the supplied first and second coolant with the refrigerant.

Meanwhile, in the air conditioner 50, each component operates to heat the interior of the vehicle. Accordingly, the refrigerant is circulated along the refrigerant line 51.

Here, the refrigerant line 51 connecting the sub-condenser 54 and the evaporator 56 is closed through the operation of the third expansion valve 55. The refrigerant connection line 61 is closed through the operation of the fourth expansion valve 63.

That is, the refrigerant line 51 connecting the sub-condenser 54 and the evaporator 56 and the refrigerant connection line 61 connected to the chiller 40 are closed through the operation of the third and fourth expansion valves 55 and 63.

The refrigerant branch line 65 may be opened through the operation of the refrigerant valve 64. In addition, the refrigerant line 51 connecting the heat exchanger 53 and the sub-condenser 54 may be closed through the operation of the refrigerant valve 64.

In this case, in the gas injection device 70, the operations of the first expansion valve 73 and the gas-liquid separator 71 stop.

In addition, the second expansion valve 74 may expand the refrigerant supplied from the internal condenser 52a through the supply unit 72 and supply the expanded refrigerant to the heat exchanger 53.

Accordingly, the heat exchanger 53 may recover the external heat source and the waste heat generated from the electrical component 15 while evaporating the refrigerant expanded while passing through the second expansion valve 74 by heat-exchanging the first coolant whose temperature rises while cooling the electrical component 15 with the second coolant whose temperature rises while recovering the external heat source.

The refrigerant passing through the heat exchanger 53 is supplied to the accumulator 57 along the refrigerant branch line 65 opened by the operation of the refrigerant valve 64.

The refrigerant supplied to the accumulator 57 is separated into a gas and a liquid. Among the refrigerants separated into the gas and liquid, the gas refrigerant is supplied to the compressor 59.

The refrigerant compressed from the compressor 59 to a high temperature and high pressure state is introduced into the internal condenser 52a.

Here, the refrigerant supplied to the internal condenser 52a may increase the temperature of the external air introduced into the HVAC module 52.

The opening/closing door 52b is opened so that the external air introduced into the HVAC module 52 and passing through the evaporator 56 passes through the internal condenser 52a.

Therefore, the external air introduced from the outside is introduced in a room temperature state in which it is not cooled at the time of passing through the evaporator 56 to which the refrigerant is not supplied. The introduced external air is changed in a high temperature state while passing through the internal condenser 52a and is then introduced into the interior of the vehicle, such that heating of the interior of the vehicle may be implemented.

In the present exemplary embodiment, an operation when the gas injection device 70 operates while recovering the external heat source and the waste heat generated from the electrical component 15 in the heating mode of the vehicle will be described with reference to FIG. 5.

Figure 5:
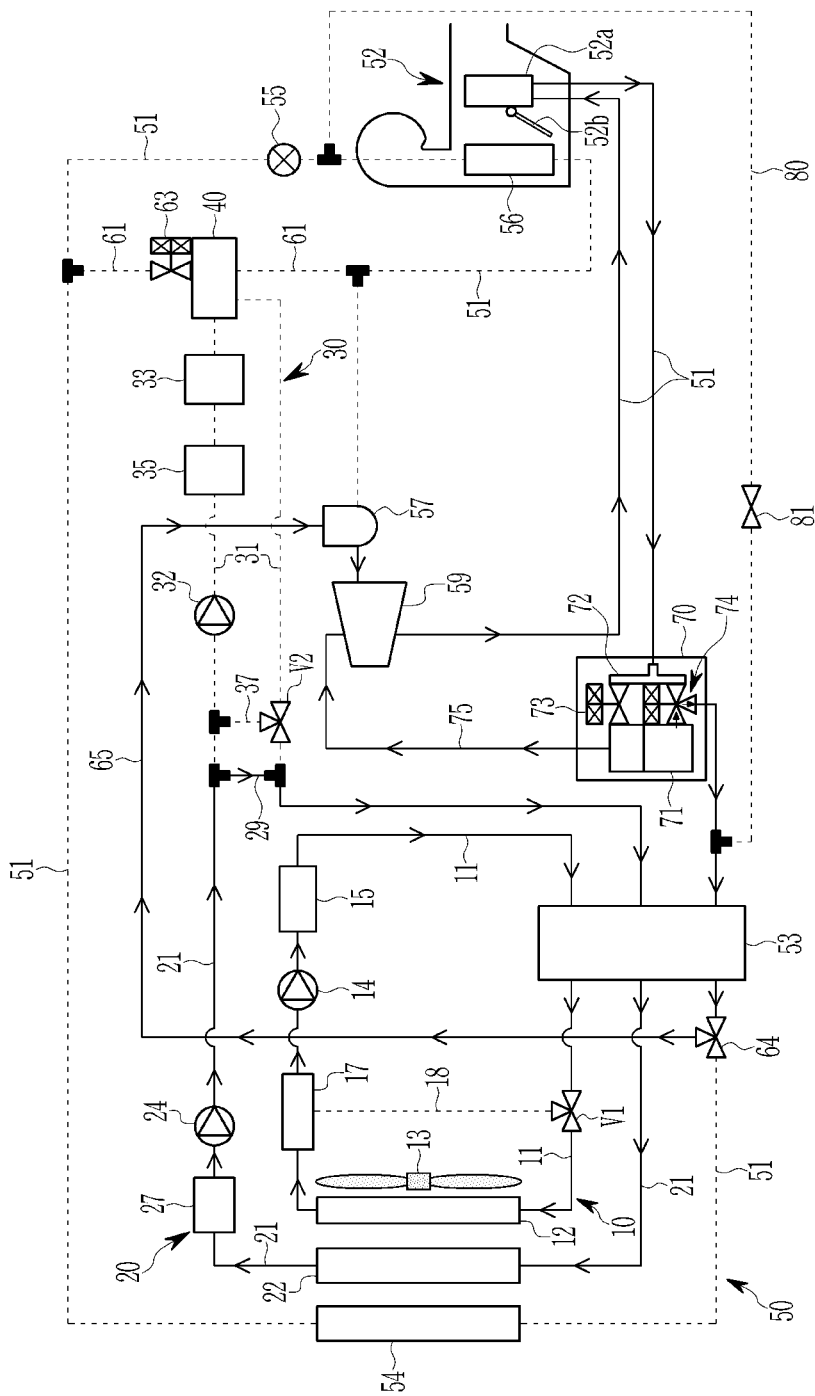
FIG. 5 is an operation state diagram for recovery of the external heat source and the waste heat generated from the electrical component according to the heating mode and an operation of a gas injection device in the heat pump system for a vehicle according to the exemplary embodiment of the present invention.

FIG. 5 is an operation state diagram for recovery of the external heat source and the waste heat generated from the electrical component according to the heating mode and an operation of a gas injection device in the heat pump system for a vehicle according to the exemplary embodiment of the present invention.

Referring to FIG. 5, the heat pump system may absorb the external heat source from the external air together with the waste heat generated from the electrical component 15.

First, in the cooling device 10, the first water pump 14 operates to circulate the first coolant.

Here, the first branch line 18 may be selectively opened or closed through the operation of the first valve V1.

That is, when the amount of heat generated by the electrical component 15 is small, the first valve V1 opens the first branch line 18 and closes the first coolant line 11 that connects the electrical component 15 and the first radiator 12.

Accordingly, the first coolant passing through the electrical component 15 continues to circulate along the first coolant line 11 without passing through the first radiator 12 and recovers the waste heat from the electrical component 15, so the temperature of the first coolant increases.

The first coolant whose temperature rises is supplied to the heat exchanger 53. In this case, the heat exchanger 53 may recover the waste heat generated from the electrical component 15 from the coolant whose temperature rises.

On the other hand, when the electrical component 15 is overheated, the first valve V1 closes the first branch line 18 and opens the first coolant line 11 that connects the electrical component 15 and the first radiator 12.

Accordingly, the first coolant passing through the electrical component 15 is circulated along the first coolant line 11 and is cooled by the first radiator 12. The first coolant cooled by the first radiator 12 cools the overheated electrical component 15, thereby preventing the electrical component 15 from being overheated any longer.

Meanwhile, in the second cooling device 20, the second water pump 24 operates to supply the second coolant to the heat exchanger 53.

Here, the second branch line 29 is opened. At the same time, the third branch line 37 is closed while the second coolant line 21 and the third coolant line 31 are not connected through the operation of the second valve V2.

That is, in the second cooling device 20, the opened second branch line 29 may be connected to the second coolant line 21, and the closed circuit through which the coolant circulates independently of the third cooling device 30 may be formed.

Meanwhile, in the third cooling device 30, the second coolant is not circulated by the third water pump 32 whose operation stops.

Accordingly, the second coolant passing through the second radiator 22 may be circulated along the second coolant line 21 and the second branch line 29 through the operation of the second water pump 24.

Here, the second coolant passing through the second coolant line 21 respectively absorbs the external heat source while passing through the second radiator 22, so the temperature of the second coolant increases. The second coolant whose temperature rises is supplied to the heat exchanger 53.

That is, in the first and second cooling devices 10 and 20, the first and second coolants whose temperature rises by the external heat source and the waste heat generated from the electrical component 15 pass through the heat exchanger 53 through the operation of the first and second water pumps 14 and 24.

In this case, the heat exchanger 53 may recover the external heat source and the waste heat generated from the electrical component 15 while heat-exchanging the supplied first and second coolants with the refrigerant.

Meanwhile, in the air conditioner 50, each component operates to heat the interior of the vehicle. Accordingly, the refrigerant is circulated along the refrigerant line 51.

Here, the refrigerant line 51 connecting the sub-condenser 54 and the evaporator 56 is closed through the operation of the third expansion valve 55. The refrigerant connection line 61 is closed through the operation of the fourth expansion valve 63.

That is, the refrigerant line 51 connecting the sub-condenser 54 and the evaporator 56 and the refrigerant connection line 61 connected to the chiller 40 are closed through the operation of the third and fourth expansion valves 55 and 63.

The refrigerant branch line 65 may be opened through the operation of the refrigerant valve 64. In addition, the refrigerant line 51 connecting the heat exchanger 53 and the sub-condenser 54 may be closed through the operation of the refrigerant valve 64.

Here, in the gas injection device 70, the first expansion valve 73 may expand the refrigerant supplied from the internal condenser 52a through the supply unit 72 and supply the expanded refrigerant to the gas-liquid separator 71.

The gas-liquid separator 71 may supply the gaseous refrigerant among the refrigerants supplied from the first expansion valve 73 to the compressor 59 through the opened supply line 75.

In addition, the second expansion valve 74 may additionally expand the refrigerant supplied from the gas-liquid separator 71 and supply the expanded refrigerant to the heat exchanger 53 connected through the refrigerant line 51.

Accordingly, the heat exchanger 53 may recover the external heat source and the waste heat generated from the electrical component 15 while evaporating the refrigerant expanded while passing through the second expansion valve 74 by heat-exchanging the first coolant whose temperature rises while cooling the electrical component 15 with the second coolant whose temperature rises while recovering the external heat source.

The refrigerant passing through the heat exchanger 53 is supplied to the accumulator 57 along the refrigerant branch line 65 opened by the operation of the refrigerant valve 64.

The refrigerant supplied to the accumulator 57 is separated into a gas and a liquid. Among the refrigerants separated into the gas and liquid, the gas refrigerant is supplied to the compressor 59.

The refrigerant compressed from the compressor 59 to a high temperature and high pressure state is introduced into the internal condenser 52a.

Here, the refrigerant supplied to the internal condenser 52a may increase the temperature of the external air introduced into the HVAC module 52.

The opening/closing door 52b is opened so that the external air introduced into the HVAC module 52 and passing through the evaporator 56 passes through the internal condenser 52a.

Therefore, the external air introduced from the outside is introduced in a room temperature state in which it is not cooled at the time of passing through the evaporator 56 to which the refrigerant is not supplied. The introduced external air is changed in a high temperature state while passing through the internal condenser 52a and is then introduced into the interior of the vehicle, such that heating of the interior of the vehicle may be implemented.

Meanwhile, among the refrigerants supplied to the gas-liquid separator 71, the gaseous refrigerant is supplied to the compressor 59 through the opened supply line 75.

That is, the gas injection device 70 may introduce the gaseous refrigerant separated while passing through the gas-liquid separator 71 back into the compressor 59 through the supply line 75, thereby increasing the flow rate of the refrigerant circulated on the refrigerant line 51.

The liquid refrigerant stored in the gas-liquid separator 71 is introduced into the heat exchanger 53 along the refrigerant line 51 opened through the operation of the fourth expansion valve 74.

In this case, the fourth expansion valve 74 may expand the refrigerant supplied from the gas-liquid separator 71.

That is, in the gas injection device 70, the gas-liquid separator 71 may supply the gas refrigerant to the compressor 59 through the supply line 75, and supply the liquid refrigerant to the fourth expansion valve 74.

Thereafter, the refrigerant may be expanded while passing through the fourth expansion valve 74, and may be evaporated by heat-exchanging with the coolant in the heat exchanger 53.

The refrigerant may smoothly recover the waste heat from the second coolant whose temperature rises while recovering the first coolant whose temperature rises and the external heat source while passing through the electrical component 15 in the heat exchanger 53, thereby improving the heating performance and efficiency.

That is, the heat pump system according to the present exemplary embodiment may absorb the external heat source from the second cooling device 20 when heating is required in an initial starting idle (IDLE) state or in an initial driving state of the vehicle, and use the waste heat of the electrical component 15 to increase the temperature of the refrigerant, thereby reducing the power consumption of the compressor 59 and improving the heating efficiency.

In addition, the present invention may improve the heating efficiency and performance while minimizing the use of a separate electric heater.

Furthermore, the gas injection device 70 may increase the flow rate of the refrigerant circulated on the refrigerant line 51, thereby maximizing the heating performance.

Meanwhile, in the present exemplary embodiment, it is described that the waste heat generated from the electrical component 15 is recovered together as an example, but the present exemplary embodiment is not limited thereto, and the waste heat generated from the battery module 33 may be selectively recovered.

That is, when the waste heat generated from the battery module 33 is recovered, the third cooling device 30 may operate, and the refrigerant connection line 61 may be opened through the operation of the fourth expansion valve 63 so that the refrigerant is supplied to the chiller 40.

In the present exemplary embodiment, the operation in the dehumidifying mode of the vehicle will be described with reference to FIG. 6.

Figure 6:
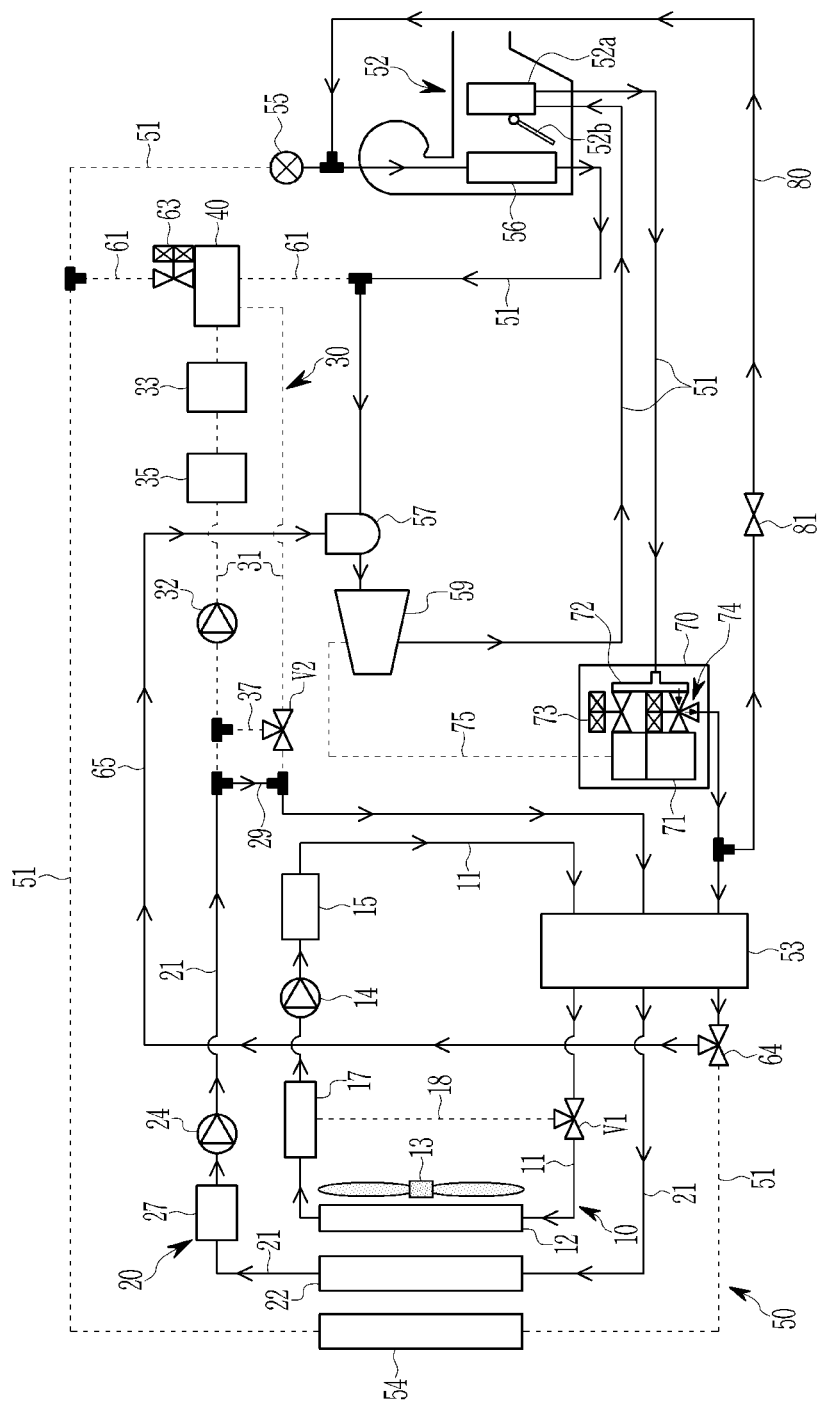
FIG. 6 is an operation state diagram for a dehumidifying mode in the heat pump system for a vehicle according to the exemplary embodiment of the present invention.

FIG. 6 is an operation state diagram for a dehumidifying mode in the heat pump system for a vehicle according to the exemplary embodiment of the present invention.

Referring to FIG. 6, the heat pump system may perform the dehumidifying mode while heating the interior of the vehicle.

First, in the cooling device 10, the first water pump 14 operates to circulate the first coolant.

Here, the first branch line 18 may be selectively opened or closed through the operation of the first valve V1.

That is, when the amount of heat generated by the electrical component 15 is small, the first valve V1 opens the first branch line 18 and closes the first coolant line 11 that connects the electrical component 15 and the first radiator 12.

Accordingly, the first coolant passing through the electrical component 15 continues to circulate along the first coolant line 11 without passing through the first radiator 12 and recovers the waste heat from the electrical component 15, so the temperature of the first coolant increases.

The first coolant whose temperature rises is supplied to the heat exchanger 53. In this case, the heat exchanger 53 may recover the waste heat generated from the electrical component 15 from the coolant whose temperature rises.

On the other hand, when the electrical component 15 is overheated, the first valve V1 closes the first branch line 18 and opens the first coolant line 11 that connects the electrical component 15 and the first radiator 12.

Accordingly, the first coolant passing through the electrical component 15 is circulated along the first coolant line 11 and is cooled by the first radiator 12. The first coolant cooled by the first radiator 12 cools the overheated electrical component 15, thereby preventing the electrical component 15 from being overheated any longer.

Meanwhile, in the second cooling device 20, the second water pump 24 operates to supply the second coolant to the heat exchanger 53.

Here, the second branch line 29 is opened. At the same time, the third branch line 37 is closed while the second coolant line 21 and the third coolant line 31 are not connected through the operation of the second valve V2.

That is, in the second cooling device 20, the opened second branch line 29 may be connected to the second coolant line 21, and the closed circuit through which the coolant circulates independently of the third cooling device 30 may be formed.

Meanwhile, in the third cooling device 30, the second coolant is not circulated by the third water pump 32 whose operation stops.

Accordingly, the second coolant passing through the second radiator 22 may be circulated along the second coolant line 21 and the second branch line 29 through the operation of the second water pump 24.

Here, the second coolant passing through the second coolant line 21 respectively absorbs the external heat source while passing through the second radiator 22, so the temperature of the second coolant increases. The second coolant whose temperature rises is supplied to the heat exchanger 53.

That is, in the first and second cooling devices 10 and 20, the first and second coolants whose temperature rises by the external heat source and the waste heat generated from the electrical component 15 pass through the heat exchanger 53 through the operation of the first and second water pumps 14 and 24.

In this case, the heat exchanger 53 may recover the external heat source and the waste heat generated from the electrical component 15 while heat-exchanging the supplied first and second coolants with the refrigerant.

Meanwhile, in the air conditioner 50, each component operates to heat the interior of the vehicle. Accordingly, the refrigerant is circulated along the refrigerant line 51.

Here, the refrigerant line 51 connecting the sub-condenser 54 and the evaporator 56 is closed through the operation of the third expansion valve 55. The refrigerant connection line 61 is closed through the operation of the fourth expansion valve 63.

That is, the refrigerant line 51 connecting the sub-condenser 54 and the evaporator 56 and the refrigerant connection line 61 connected to the chiller 40 are closed through the operation of the third and fourth expansion valves 55 and 63.

The refrigerant branch line 65 may be opened through the operation of the refrigerant valve 64. In addition, the refrigerant line 51 connecting the heat exchanger 53 and the sub-condenser 54 may be closed through the operation of the refrigerant valve 64.

In this case, in the gas injection device 70, the operations of the first expansion valve 73 and the gas-liquid separator 71 stop.

In addition, the second expansion valve 74 may expand the refrigerant supplied from the internal condenser 52a through the supply unit 72 and supply the expanded refrigerant to the heat exchanger 53.

Accordingly, the heat exchanger 53 may recover the external heat source and the waste heat generated from the electrical component 15 while evaporating the refrigerant expanded while passing through the second expansion valve 74 by heat-exchanging the first coolant whose temperature rises while cooling the electrical component 15 with the second coolant whose temperature rises while recovering the external heat source.

Here, the dehumidifying line 80 is opened through the operation of the check valve 81 so that a portion of the refrigerant expanded through the operation of the second expansion valve 74 is supplied to the evaporator 56.

Accordingly, a portion of the refrigerants expanded by the second expansion valve 74 may be introduced into the evaporator 56 through the opened dehumidifying line 80.

The refrigerant evaporated in the heat exchanger 53 is supplied to the accumulator 57 along the refrigerant branch line 65 opened by the operation of the refrigerant valve 64.

The refrigerant supplied to the accumulator 57 is separated into a gas and a liquid. Among the refrigerants separated into the gas and liquid, the gas refrigerant is supplied to the compressor 59.

The refrigerant compressed from the compressor 59 to a high temperature and high pressure state is introduced into the internal condenser 52a.

Here, the refrigerant supplied to the internal condenser 52a may increase the temperature of the external air introduced into the HVAC module 52.

The opening/closing door 52b is opened so that the external air introduced into the HVAC module 52 and passing through the evaporator 56 passes through the internal condenser 52a.

That is, the external air introduced into the HVAC module 52 is dehumidified by the refrigerant, which is introduced into the evaporator 56 and is in a low-temperature state, while passing through the evaporator 56. Thereafter, the outside air is changed to the high-temperature state while passing through the internal condenser 52a and introduced into the interior of the vehicle, thereby heating and dehumidifying the interior of the vehicle.

Meanwhile, the gas injection device 70 configured in this way may selectively operate in the dehumidifying mode of the vehicle.

First, when the gas injection device 70 does not operate, the second expansion valve 74 may expand the refrigerant supplied from the internal condenser 52a through the supply unit 72 and supply the expanded refrigerant to the heat exchanger 53.

Accordingly, the heat exchanger 53 may evaporate the refrigerant by heat-exchanging the refrigerant with the first and second coolants.

On the other hand, when the gas injection device 70 operates, the first expansion valve 73 expands the refrigerant supplied from the internal condenser 52a through the supply unit 72 and supplies the expanded refrigerant to the gas-liquid separator 71.

Among the refrigerants supplied to the gas-liquid separator 71, the gaseous refrigerant is supplied to the compressor 59 through the opened supply line 75.

That is, the gas injection device 70 may introduce the gaseous refrigerant separated while passing through the gas-liquid separator 71 back into the compressor 59 through the supply line 75, thereby increasing the flow rate of the refrigerant circulated on the refrigerant line 51.

The liquid refrigerant stored in the gas-liquid separator 71 is introduced into the heat exchanger 53 along the refrigerant line 51 opened through the operation of the second expansion valve 74.

In this case, the fourth expansion valve 74 expands the refrigerant supplied from the gas-liquid separator 71.

Accordingly, the heat exchanger 53 may evaporate the refrigerant by heat-exchanging the refrigerant with the first coolant or the second coolant.

That is, in the gas injection device 70, the gas-liquid separator 71 may supply the gas refrigerant to the compressor 59 through the supply line 75, and supply the liquid refrigerant to the second expansion valve 74.

Thereafter, the refrigerant may be expanded while passing through the fourth expansion valve 74, and may be evaporated by heat-exchanging with the first coolant or the second coolant in the heat exchanger 53.

A portion of the refrigerant expanded while passing through the second expansion valve 74 is supplied to the evaporator 56 along the opened dehumidifying line 80.

Therefore, the external air introduced into the HVAC module 52 is dehumidified by the refrigerant, which is introduced into the evaporator 56 and is in a low-temperature state, while passing through the evaporator 56. Thereafter, the outside air is changed to the high temperature state while passing through the internal condenser 52a and introduced into the interior of the vehicle, thereby smoothly heating and dehumidifying the interior of the vehicle.

Therefore, as described above, according to the heat pump system for a vehicle according to an embodiment of the present invention, it is possible to simplify the entire system by using one chiller in which a coolant and a refrigerant exchange heat with each other to control the temperature of the battery module 33 according to a mode of the vehicle.

In addition, according to an embodiment of the present invention, it is possible to increase the entire travel distance of the vehicle by efficiently regulating the temperature of the battery module 33 to exhibit the optimal performance of the battery module 33 and effectively managing the battery module 33 to increase the entire travel distance of the vehicle.

In addition, according to an embodiment of the present invention, it is possible to improve the heating efficiency by selectively using the external heat source or the waste heat generated from the electrical component 15 in the heating mode of the vehicle.

In addition, according to an embodiment of the present invention, it is possible to maximize the heating performance by applying the gas injection device 70 to selectively increase the flow rate of the refrigerant in the heating mode.

In addition, according to an exemplary embodiment of the present invention, it is possible to reduce the manufacturing cost, reduce the weight, and improve the space utilization by simplifying the entire system.

Although the present disclosure has been described hereinabove with reference to exemplary embodiments and the drawings, the present disclosure is not limited thereto, but may be variously modified and altered by those skilled in the art to which the present disclosure pertains without departing from the spirit and scope of the present disclosure defined in the claims.

DESCRIPTION OF SYMBOLS 10, 20, 30: First, second, and third cooling device
11, 21, 31: First, second, and third coolant line
12, 22: First, and second radiator
13: Cooling fan
14, 24, 32: First, second, and third water pump
15: Electrical component
17, 27: First, and second reservoir tank
18, 29, 37: First, second, and third branch line
33: Battery module
35: Coolant heater
50: Air conditioner
51: Refrigerant line
52: HVAC module
53: Heat exchanger
54: Sub-condenser
55, 63: Third, and fourth expansion valve
56: Evaporator
57: Accumulator
59: Compressor
61: Refrigerant connection line
64: Refrigerant valve
65: Refrigerant branch line
70: Gas injection device
71: Gas-liquid separator
72: Supply unit
73, 74: First, and second expansion valve
75: Supply line
80: Dehumidifying line
81: Check valve
V1, V2: First, and second valve

What is claimed is:

1. A heat pump system for a vehicle, comprising:
   a first cooling device including a first radiator, a first water pump, and a first valve connected by a first coolant line and configured to circulate a first coolant on the first coolant line to cool at least one electrical device provided on the first coolant line;
   a second cooling device including a second radiator and a second water pump connected by a second coolant line, and configured to circulate a second coolant on the second coolant line;
   a third cooling device including a third coolant line connected to the second cooling device through the first valve, a third water pump provided on the third coolant line, and a battery module and configured to selectively circulate the second coolant on the third coolant line;
   a chiller provided on the third coolant line, connected to a refrigerant line of an air conditioner through a refrigerant connection line, and configured to exchange heat between the second coolant selectively introduced through the third coolant line and a coolant selectively supplied from the air conditioner to control a temperature of the second coolant circulated on the third coolant line; and
   a gas injection device configured to selectively expand a refrigerant supplied from an internal condenser included in the air conditioner and supply the expanded refrigerant to a heat exchanger of the air conditioner, and selectively supply a portion of the refrigerant to a compressor in the refrigerant supplied from the internal condenser to the compressor to increase a flow rate of the refrigerant circulated on the refrigerant line, wherein the heat exchanger is connected to the first coolant line and the second coolant line, respectively, so that the first coolant and the second coolant are configured to pass through, wherein the gas injection device comprises:
     a gas-liquid separator separating a gas refrigerant and a liquid refrigerant among the refrigerants introduced thereinto and selectively discharging the gas refrigerant and the liquid refrigerant;
     a supply unit connected to the internal condenser through the refrigerant line so that the refrigerant supplied from the internal condenser is configured to be introduced to the supply unit;
     a first expansion valve between the gas-liquid separator and the supply unit configured to selectively expand the refrigerant supplied to the supply unit and supply the expanded refrigerant to the gas-liquid separator;
     a second expansion valve between the gas-liquid separator and the supply unit configured to selectively expand the refrigerant supplied to the supply unit and supply the expanded refrigerant to the heat exchanger or supply the refrigerant supplied from the gas-liquid separator to the heat exchanger; and
     a supply line connecting the gas-liquid separator and the compressor, and configured to selectively supply a gaseous refrigerant from the gas-liquid separator to the compressor.

2. The heat pump system of claim 1, wherein the air conditioner comprises:
   a HVAC module including an evaporator connected through the refrigerant line and including an opening/closing door provided therein to control external air passing through the evaporator to be selectively introduced into the internal condenser according to cooling, heating, and dehumidifying modes of the vehicle;
   a compressor connected between the evaporator and the internal condenser through the refrigerant line;
   a sub-condenser provided on the refrigerant line between the heat exchanger and the evaporator;

a third expansion valve provided on the refrigerant line connecting the sub-condenser and the evaporator;
a fourth expansion valve provided on the refrigerant connection line;
an accumulator provided on the refrigerant line between the evaporator and the compressor and connected to the refrigerant connection line; and
a dehumidifying line having a first end connected to the refrigerant line between the internal condenser and the heat exchanger and a second end connected to the refrigerant line between the evaporator and the third expansion valve, and including a check valve.

3. The heat pump system of claim 2, wherein the heat exchanger is further configured to condense or evaporate a refrigerant condensed in the internal condenser by heat exchanging heat with a first coolant and a second coolant or any one of the first and second coolants according to a selective operation of the gas injection device.

4. The heat pump system of claim 2, wherein the fourth expansion valve is configured to expand the coolant introduced through a coolant connection line and to introduce the expanded coolant into the chiller when the battery module is cooled using the coolant that is heat-exchanged heat with the refrigerant.

5. The heat pump system of claim 2, wherein the heat pump system is configured so that when the gas injection device operates in a heating mode of the vehicle:
the first expansion valve expands the refrigerant supplied from the internal condenser through the supply unit and supplies the expanded refrigerant to the gas-liquid separator,
the second expansion valve expands the refrigerant supplied from the gas-liquid separator and makes the expanded refrigerant flow into the refrigerant line,
the supply line is opened, and
the gas-liquid separator supplies the gaseous refrigerant among the refrigerants introduced thereinto to the compressor through the opened supply line.

6. The heat pump system of claim 2, wherein the heat pump system is configured so that when the gas injection device does not operate in a heating mode of the vehicle:
an operation of the first expansion valve stops;
the introduction of the refrigerant into the gas-liquid separator is blocked, and
the second expansion valve expands the refrigerant supplied from the internal condenser through the supply unit and supplies the expanded refrigerant to the heat exchanger.

7. The heat pump system of claim 2, wherein the heat pump system is configured so that when a cooling mode or dehumidifying mode of the vehicle:
an operation of the first expansion valve stops in the gas injection device,
the second expansion valve makes the refrigerant flow through the refrigerant line without expanding the refrigerant supplied from the internal condenser through the supply unit, and
the introduction of the refrigerant into the gas-liquid separator is blocked.

8. The heat pump system of claim 2, wherein the air conditioner further comprises a refrigerant branch line configured to selectively introduce the refrigerant discharged from the heat exchanger directly into the accumulator between the heat exchanger and the sub-condenser through an operation of a refrigerant valve provided on the refrigerant line, wherein the refrigerant valve is configured to open the refrigerant branch line in a heating mode of the vehicle.

9. The heat pump system of claim 8, wherein:
the first cooling device is provided with a first branch line connected to the first coolant line between a first radiator and a first water pump through the first valve provided on the first coolant line between the first radiator and the first water pump,
the second cooling device is provided with a second branch line separating the second coolant line and the third coolant line, and
the third cooling device is provided with a third branch line connected to the third coolant line through a second valve to form a closed circuit independent of the second cooling device.

10. The heat pump system of claim 2, wherein the first and fourth expansion valves are each a 2-way electronic expansion valve that is configured to selectively expand the refrigerant while controlling the flow of the refrigerant and wherein the first and fourth expansion valves each has one inlet and one outlet.

11. The heat pump system of claim 2, wherein the second expansion valve is a 3-way electronic expansion valve that selectively expands the refrigerant while controlling the flow of the refrigerant and has two inlets and one outlet.

12. A heat pump system for a vehicle, comprising:
a first cooling device including a first radiator, a first water pump, and a first valve connected by a first coolant line and configured to circulate a first coolant on the first coolant line to cool at least one electrical component provided on the first coolant line;
a second cooling device including a second radiator and a second water pump connected by a second coolant line, and configured to circulate a second coolant on the second coolant line;
a third cooling device including a third coolant line connected to the second cooling device through the first valve, a third water pump provided on the third coolant line, and a battery module and configured to selectively circulate the second coolant on the third coolant line, the first cooling device having a first branch line connected to the first coolant line between a first radiator and a first water pump through the first valve provided on the first coolant line between the first radiator and the first water pump, the second cooling device having a second branch line separating the second coolant line and the third coolant line, and the third cooling device having a third branch line connected to the third coolant line through a second valve to form a closed circuit independent of the second cooling device;
a chiller provided on the third coolant line, connected to a refrigerant line of an air conditioner through a refrigerant connection line, and configured to exchange heat between the second coolant selectively introduced through the third coolant line and a coolant selectively supplied from the air conditioner to control a temperature of the second coolant circulated on the third coolant line;
a gas injection device configured to selectively expand a refrigerant supplied from an internal condenser included in the air conditioner and supply the expanded refrigerant to a heat exchanger of the air conditioner, and selectively supply a portion of the refrigerant to a compressor in the refrigerant supplied from the internal condenser to the compressor, wherein the heat exchanger is connected to the first coolant line and the second coolant line, respectively, so that the first coolant and the second coolant are configured to pass through, the gas injection device comprising:
- a gas-liquid separator separating a gas refrigerant and a liquid refrigerant among the refrigerants introduced thereinto and selectively discharging the gas refrigerant and the liquid refrigerant; and
- a supply unit connected to the internal condenser through the refrigerant line so that the refrigerant supplied from the internal condenser is configured to be introduced to the supply unit;

a HVAC module including an evaporator connected through the refrigerant line and including an opening/closing door provided therein to control external air passing through the evaporator to be selectively introduced into the internal condenser according to cooling, heating, and dehumidifying modes of the vehicle;

a compressor connected between the evaporator and the internal condenser through the refrigerant line;

a sub-condenser provided on the refrigerant line between the heat exchanger and the evaporator;

an accumulator provided on the refrigerant line between the evaporator and the compressor and connected to the refrigerant connection line; and a refrigerant branch line configured to selectively introduce the refrigerant discharged from the heat exchanger directly into the accumulator between the heat exchanger and the sub-condenser through an operation of a refrigerant valve provided on the refrigerant line, wherein the refrigerant valve opens the refrigerant branch line in a heating mode of the vehicle.

13. The heat pump system of claim 12, wherein the system is configured so that when the battery module is cooled in a cooling mode of the vehicle:
- in the first cooling device, the first branch line is closed through an operation of the first valve, and the first coolant cooled by the first radiator is circulated to the electrical component through an operation of the first water pump,
- the second branch line is closed, and the third branch line is closed through an operation of the second valve,
- the second coolant line and the third coolant line are connected by the closed second and third branch lines,
- in the second cooling device and the third cooling device, the second coolant is circulated on the second coolant line and the third coolant line through an operation of the second water pump and an operation of the third water pump,
- in the third cooling device, the second coolant passing through the chiller is supplied to the battery module,
- in the air conditioner, the refrigerant is circulated along the refrigerant line and the refrigerant connection line while the refrigerant connection line is opened,
- expanded refrigerant is supplied to the evaporator and the chiller, respectively,
- the refrigerant branch line is closed through the operation of the refrigerant valve, and
- in the gas injection device, refrigerant is supplied from the internal condenser to the heat exchanger without expanding the refrigerant.

14. The heat pump system of claim 12, wherein the system is configured so that:
- in the first cooling device, the first coolant cooled by the first radiator is supplied to the heat exchanger through the operation of the first water pump,
- the second coolant cooled by the second radiator sequentially passes through the battery module and the chiller along the second coolant line and the third coolant line connected to each other through the operations of the second water pump and the third water pump, and then is supplied to the heat exchanger, and
- the heat exchanger condenses the refrigerant by heat-exchanging the refrigerant with each of the first and second coolants.

15. The heat pump system of claim 12, wherein the system is configured so that when recovering an external heat source and waste heat generated from the electrical component in a heating mode of the vehicle:
- the first branch line is selectively opened or closed through the operation of the first valve,
- in the first cooling device, the first coolant is circulated to the electrical component through the operation of the first water pump,
- the third branch line is closed and the second branch line is opened while the connection between the second coolant line and the third coolant line is closed through the operation of the second valve,
- in the second cooling device, the second coolant is circulated along the second coolant line and the opened second branch line through the operation of the second water pump,
- in the third cooling device, the operation of the third water pump stops,
- in the air conditioner, the refrigerant line connecting the sub-condenser and the evaporator is closed,
- the refrigerant connection line is closed,
- the refrigerant branch line is opened through the operation of the refrigerant valve,
- in the gas injection device, the operation of the gas-liquid separator stop,
- expand the refrigerant from the internal condenser and supply the expanded refrigerant to the heat exchanger connected through the refrigerant line, and
- the heat exchanger recovers the external heat source and the waste heat generated from the electrical component while evaporating the refrigerant supplied by heat-exchanging the first coolant whose temperature rises while cooling the electrical component with the second coolant whose temperature rises while recovering the external heat source.

16. The heat pump system of claim 12, wherein the system is configured so that when the gas injection device operates while recovering an external heat source and waste heat generated from the electrical component in the heating mode of the vehicle:
- the first branch line is selectively opened or closed through the operation of the first valve,
- in the first cooling device, the first coolant is circulated to the electrical component through the operation of the first water pump,
- the third branch line is closed and the second branch line is opened while the connection between the second coolant line and the third coolant line is closed through the operation of the second valve,
- in the second cooling device, the second coolant is circulated along the second coolant line and the opened second branch line through the operation of the second water pump,
- in the third cooling device, the operation of the third water pump stops,
- in the air conditioner, the refrigerant line connecting the sub-condenser and the evaporator is closed, the refrigerant connection line is closed, the refrigerant branch line is opened through the operation of the refrigerant valve, in the gas injection device, refrigerant from the supply unit is expanded and supplies the expanded refrigerant to the gas-liquid separator, the gas-liquid separator supplies the gas refrigerant among the refrigerant supplied to the compressor through the open supply line, additionally expand the refrigerant supplied from the gas-liquid separator and supplies the expanded refrigerant to the heat exchanger connected through the refrigerant line, and the heat exchanger recovers the external heat source and the waste heat generated from the electrical component while evaporating the refrigerant by heat-exchanging the first coolant whose temperature rises while cooling the electrical component with the second coolant whose temperature rises while recovering the external heat source.

17. The heat pump system of claim 12, wherein the system is configured so that in the heating and dehumidifying mode of the vehicle:

the first branch line is selectively opened or closed through the operation of the first valve, in the first cooling device, the coolant is circulated to the electrical component through the operation of the first water pump, the third branch line is closed and the second branch line is opened while the connection between the second coolant line and the third coolant line is closed through the operation of the second valve, in the second cooling device, the second coolant is circulated along the second coolant line and the opened second branch line through the operation of the second water pump, the operation of the third cooling device stops, in the air conditioner, the refrigerant line connecting the sub-condenser and the evaporator is closed, the refrigerant connection line is closed, the refrigerant branch line is opened through the operation of the refrigerant valve, the refrigerant line connecting the heat exchanger and the sub-condenser is closed through the operation of the refrigerant valve, in the gas injection device, the operation of the gas-liquid separator stop, expand the refrigerant supplied from the internal condenser and supply the expanded refrigerant to the heat exchanger connected through the refrigerant line, and the heat exchanger recovers waste heat generated from the electrical component while evaporating the refrigerant by heat-exchanging the refrigerant with a coolant whose temperature rises while cooling the electrical component, and a dehumidifying line is opened so that a portion of the refrigerant expanded is supplied to the evaporator.

18. The heat pump system of claim 12, wherein the system is configured so that when cooling the electrical component and the battery module using the coolant:

the first branch line is closed through the operation of the first valve, the second branch line is closed, the second valve connects the second coolant line and the third coolant line, and closes the third branch line;

the first coolant cooled by the first radiator is supplied to the electrical component along the first coolant line through the operation of the first water pump, the second coolant cooled by the second radiator is supplied to the battery module along the second and third coolant lines through the operations of the second and third water pumps, and the operations of the air conditioner and the gas injection device stop.

19. The heat pump system of claim 12, wherein the heat exchanger is a water-cooled heat exchanger, and the sub-condenser is an air-cooled heat exchanger.

20. The heat pump system of claim 12, wherein the electrical component includes a power controller, an inverter, an on board charger (OBC), a power converter, or an autonomous driving controller.

* * * * *